(12) United States Patent
Yamazaki

(10) Patent No.: US 8,060,628 B2
(45) Date of Patent: Nov. 15, 2011

(54) TECHNIQUE FOR REALIZING HIGH RELIABILITY IN INTER-APPLICATION COMMUNICATION

(75) Inventor: Takeshi Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 12/492,998

(22) Filed: Jun. 26, 2009

(65) Prior Publication Data

US 2010/0082822 A1 Apr. 1, 2010

(30) Foreign Application Priority Data

Sep. 29, 2008 (JP) ................................ 2008-249942

(51) Int. Cl.
G06F 15/16 (2006.01)
(52) U.S. Cl. ..................... 709/228; 370/395.2; 370/420; 370/463
(58) Field of Classification Search .................. 370/236, 370/406, 469; 725/37; 709/228
See application file for complete search history.

(56) References Cited

U.S. PATENT DOCUMENTS

| | | | |
|---|---|---|---|
| 6,577,599 B1 * | 6/2003 | Gupta et al. .................. 370/236 |
| 6,792,615 B1 * | 9/2004 | Rowe et al. ...................... 725/37 |
| 7,177,325 B2 * | 2/2007 | Claseman ...................... 370/469 |
| 2009/0268746 A1 * | 10/2009 | Ogasahara et al. ........... 370/406 |

FOREIGN PATENT DOCUMENTS

| | | |
|---|---|---|
| JP | 04-207338 A | 7/1992 |
| JP | 06-253373 A | 9/1994 |

* cited by examiner

Primary Examiner — Dustin Nguyen
(74) Attorney, Agent, or Firm — Fujitsu Patent Center

(57) ABSTRACT

A storage medium storing a program, in inter-application communication that is performed between a first application operating on a first node and a second application operating on a second node, for making the first node perform processes by transmitting a same packet simultaneously to all the communication paths, the processes including: a trouble monitoring session establishing process in which, whether or not a trouble monitoring session has already been established between a first communication control unit and a second communication control unit is checked; an inter-application communication session establishing process in which, a request for establishing the inter-application communication session is performed to the second application and the inter-application communication session is established; and a trouble monitoring communication process in which trouble monitoring communication is performed using only necessary information for trouble monitoring in the trouble monitoring session and at a shorter interval than an interval between retransmission processes.

15 Claims, 34 Drawing Sheets

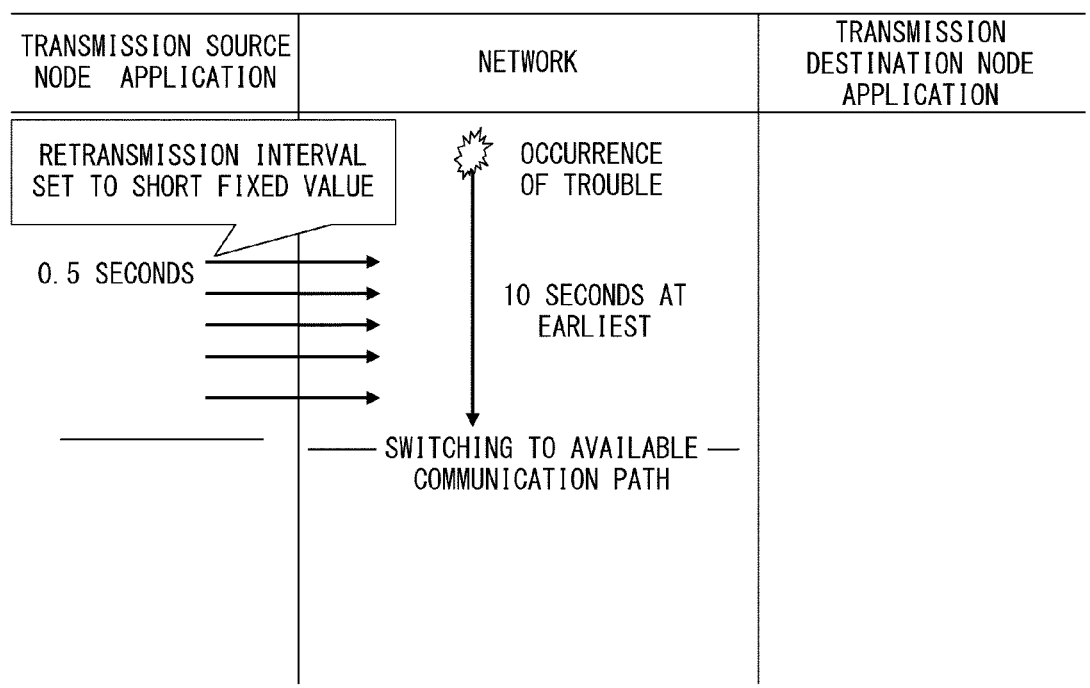
F I G. 3

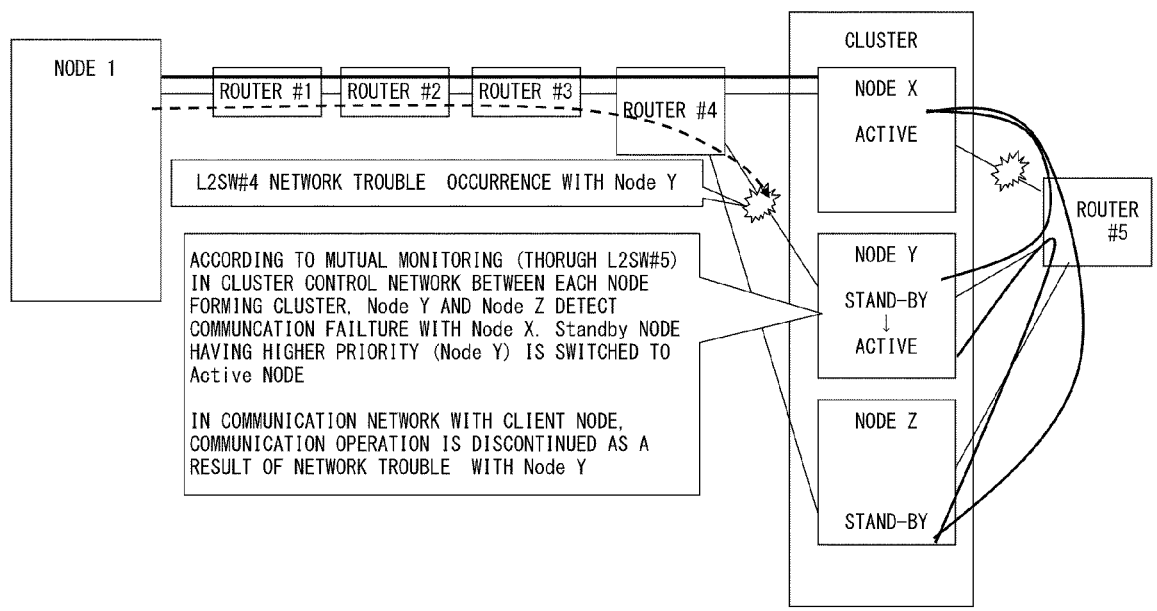
F I G. 5

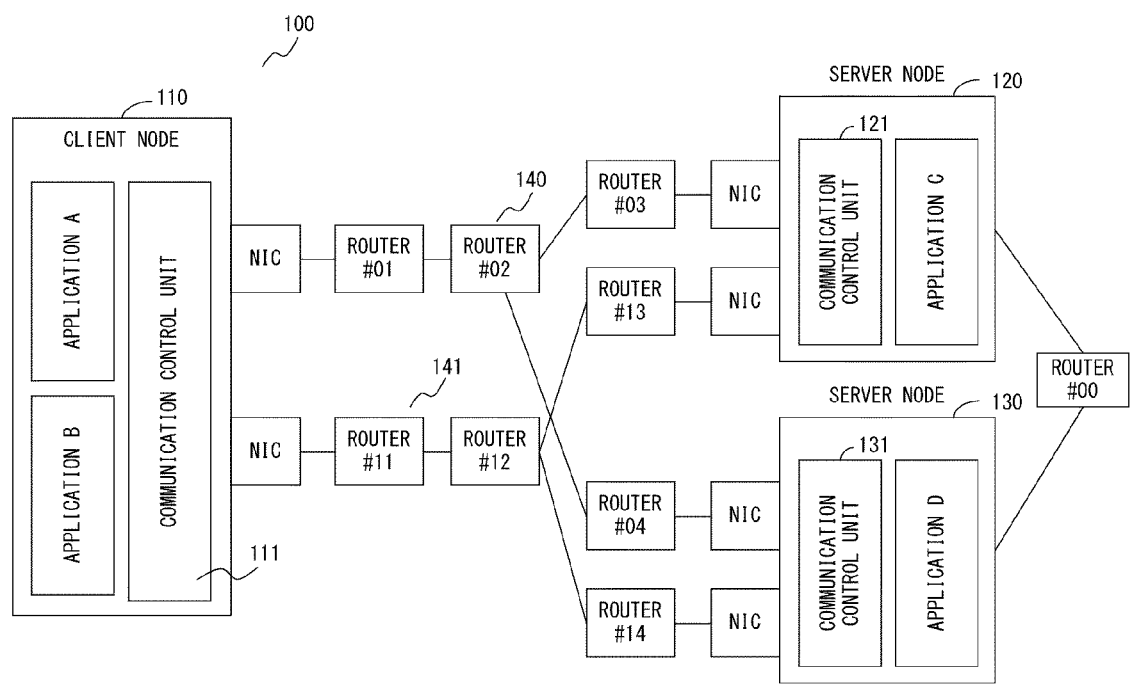
F I G. 6

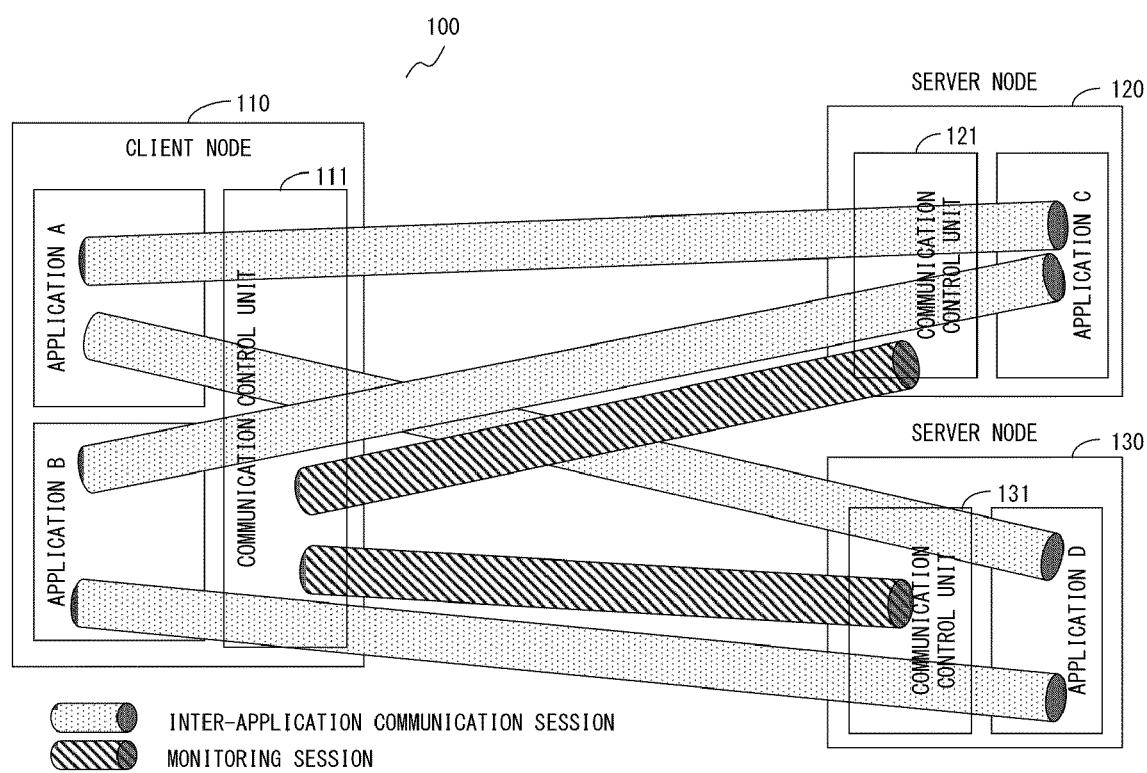
F I G. 7

| MULTICAST IP ADDRESS | PORT NUMBER | TRANSMISSION SEQUENCE NUMBER | RECIPITENT LIST ||||||
|---|---|---|---|---|---|---|---|---|
| | | | NODE NUMBER | IP ADDRESS | STATUS 1 | STATUS 2 | NODE STATUS | RESPONSE UNRECEIVED NUMBER |
| 224.0.0.1 | 5000 | 1 | 1 | 192.168.1.110 | ACTIVE | 0 | 1 | 0 |
| | | | 2 | 192.168.1.120 | STAND-BY 1 | 0 | 1 | 0 |
| | | | 3 | 192.168.1.130 | STAND-BY 2 | 0 | 1 | 0 |

FIG. 12

| TRANSMISSION SOURCE IP ADDRESS | TRANSMISSION SOURCE PORT NUMBER | MULTICAST IP ADDRESS | PORT NUMBER | RECEPTION SEQUENCE NUMBER | REQUEST UNRECEIVED NUMBER | OWN NODE NUMBER | STATUS 1 | STATUS 2 | OTHER NODE STATUS | |
|---|---|---|---|---|---|---|---|---|---|---|
| | | | | | | | | | NODE NUMBER | NODE STATUS |
| 10.1.1.1 | 9000 | 224.0.0.1 | 5000 | 1 | 0 | 1 | ACTIVE | 0 | 2 | 1 |
| | | | | | | | | | 3 | 1 |

FIG. 13

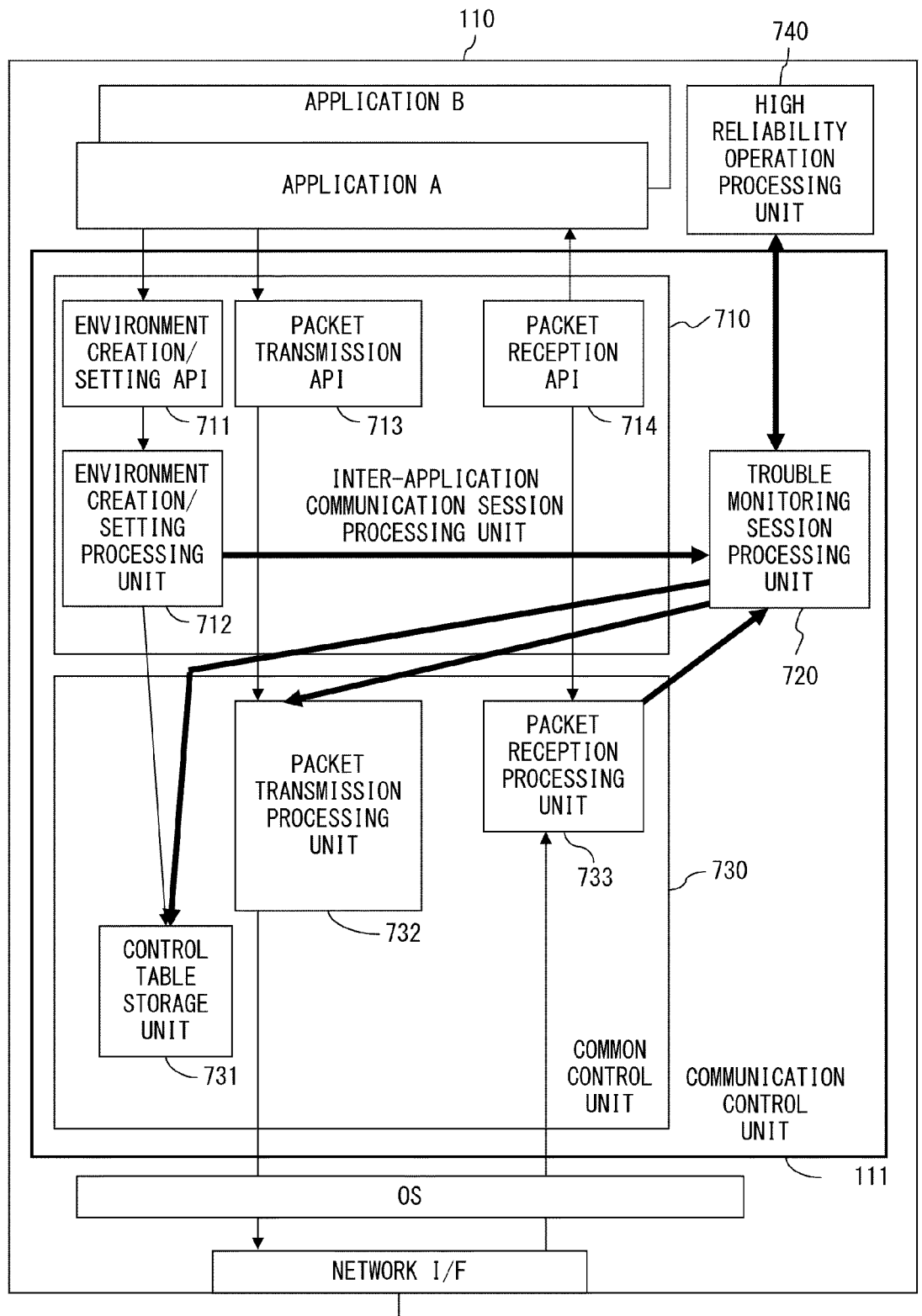
F I G. 14

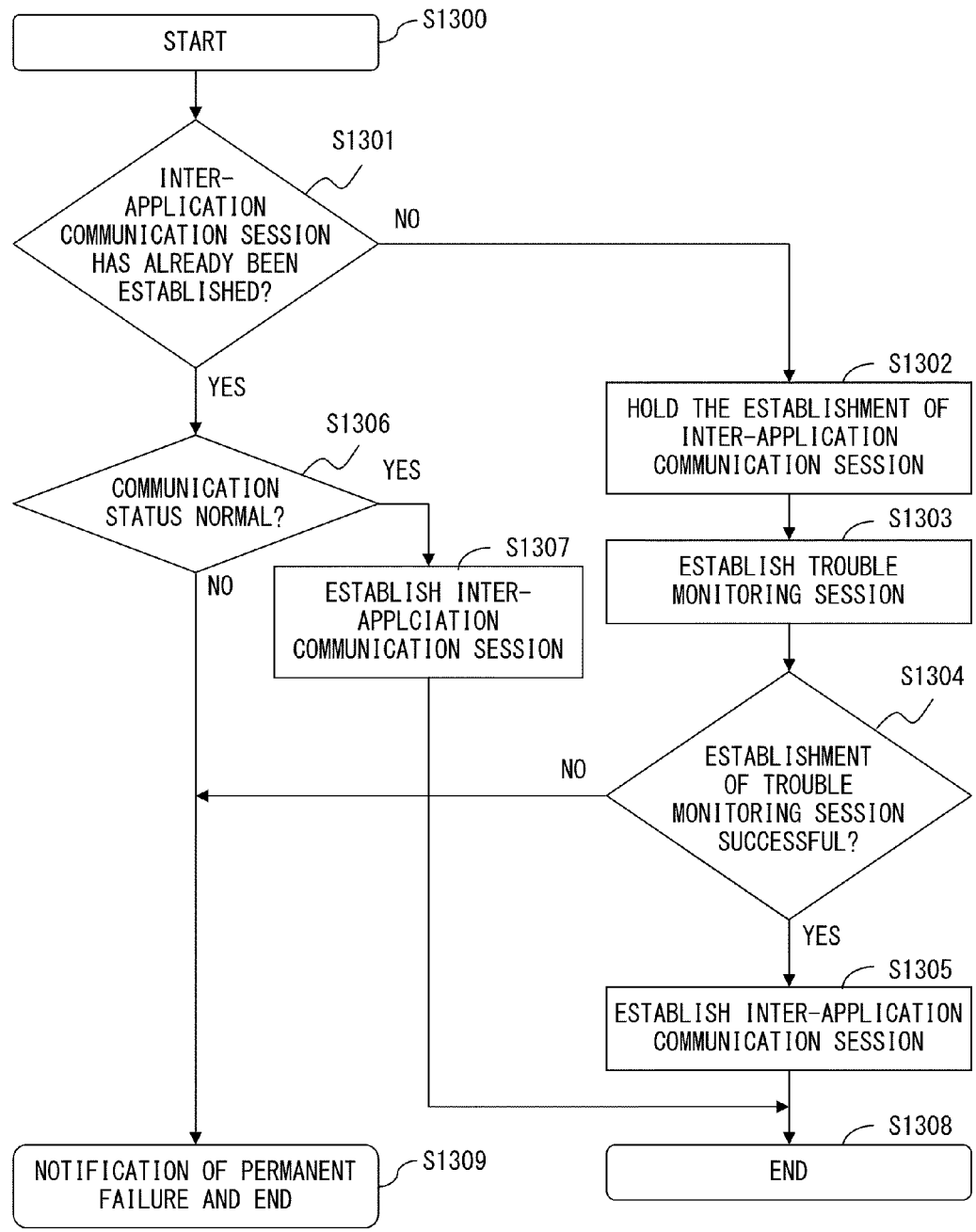
F I G. 1 8

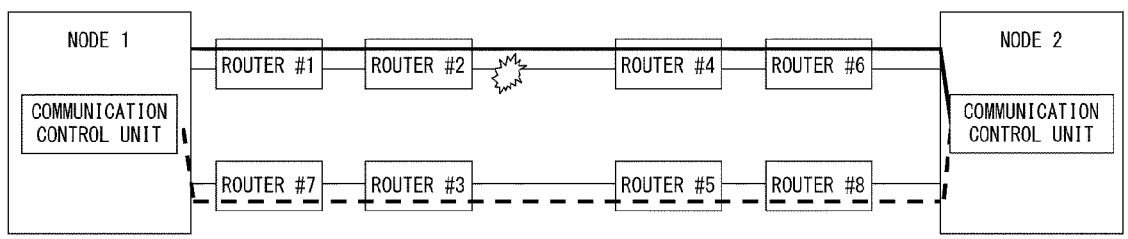
F I G. 2 8

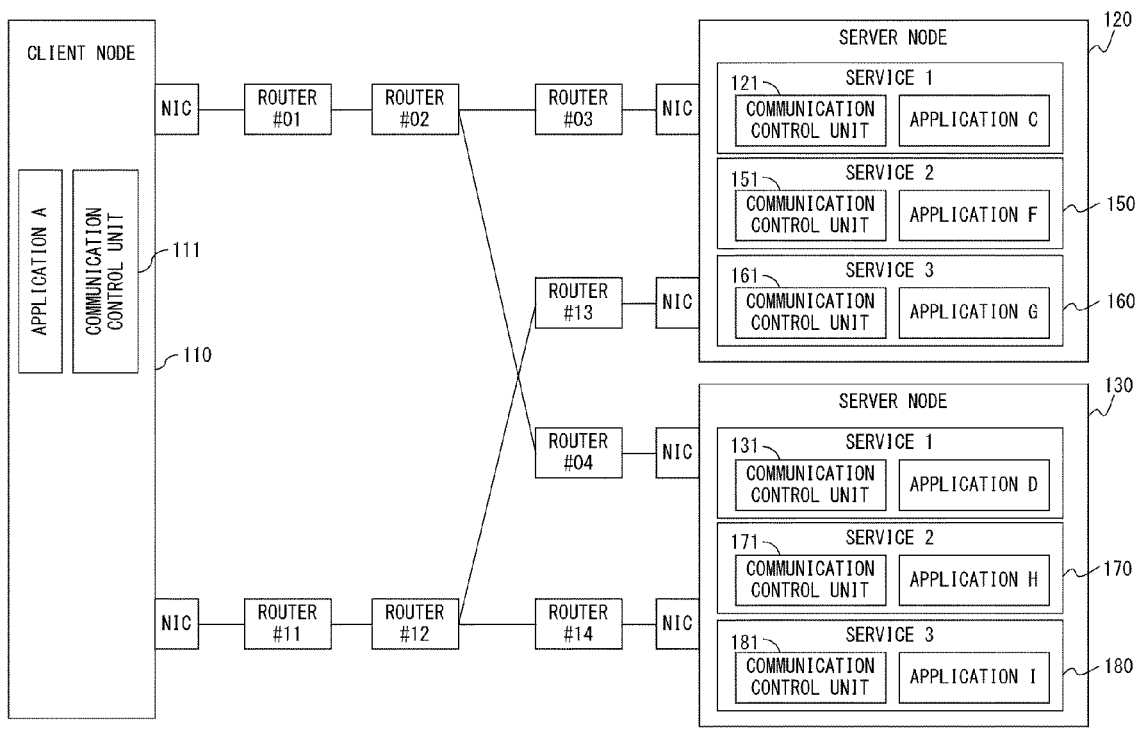
F I G. 3 3

| MULTICAST IP ADDRESS | PORT NUMBER | SERVICE NAME | TRANSMISSION SEQUENCE NUMBER | RECIPIENT LIST ||||||
|---|---|---|---|---|---|---|---|---|---|
| | | | | NODE NUMBER | IP ADDRESS | STATUS1 | STATUS2 | NODE STATUS | NUMBER OF RESPONSE UNRECEPTION |
| 224.0.0.1 | 5000 | SERVICE 1 | 10 | 1 | 192.168.1.110 | ACTIVE | 0 | 1 | 0 |
| | | | | 2 | 192.168.1.120 | STAND-BY 1 | 0 | 1 | 0 |
| | | | | 3 | 192.168.1.130 | STAND-BY 2 | 0 | 1 | 0 |
| 224.0.0.1 | 6000 | SERVICE 2 | 9 | 1 | 192.168.1.110 | ACTIVE | 0 | 1 | 0 |
| | | | | 2 | 192.168.1.120 | STAND-BY 1 | 0 | 1 | 0 |
| | | | | 3 | 192.168.1.130 | STAND-BY 2 | 0 | 1 | 0 |
| 224.0.0.1 | 7000 | SERVICE 3 | 109 | 1 | 192.168.1.110 | ACTIVE | 0 | 1 | 0 |
| | | | | 2 | 192.168.1.120 | STAND-BY 1 | 0 | 1 | 0 |
| | | | | 3 | 192.168.1.130 | STAND-BY 2 | 0 | 1 | 0 |

FIG. 34

TECHNIQUE FOR REALIZING HIGH RELIABILITY IN INTER-APPLICATION COMMUNICATION

CROSS-REFERENCE TO RELATED APPLICATION

This application is based upon and claims the benefit of priority of the prior Japanese Patent Application No. 2008-249942, filed on Sep. 29, 2008, the entire contents of which are incorporated herein by reference.

FIELD

The present invention relates to a technique for realizing high-reliability in communication between applications.

BACKGROUND

Conventionally, various measures have been taken for enhancing availability of the communication between applications that operate on the respective nodes connected via a network and the like. The communication between applications is to be referred to simply as "inter-application communications".

In relation to the above technique, a transmission path switching system during a trouble in broadcast communication has been known. According to the system, trouble detection in a transmission path of a network system engaged in broadcast communication and the switching of transmission paths are performed for realizing high reliability in the network system performing the broadcast communication. In addition, there is a known distributed-type control apparatus that reduces communication load and performs the communication of various messages reliably from the control apparatus to an operator station.

[Patent document 1] Japanese Laid-open Patent Application No. 04-207338

[Patent document 2] Japanese Laid-open Patent Application No. 06-253373

SUMMARY

Conventionally, the following measures have been taken in order to enhance the availability of inter-application communication.

(1) To Make Communication Path of a Network Redundant

In order to realize high reliability in a network, as illustrated in FIG. 1, network devices such as routers and the communication paths are made redundant, and detection of a path failure and switching of communication paths using a dynamic routing protocol are performed, as a general practice.

FIG. 1 illustrates the outline of a process for switching the communication paths from the one illustrated with a solid line to the one illustrated with a broken line using a routing protocol, when a network failure is detected between a router #2 and a router #4, and between the router #2 and a router #5.

However, in the case of the communication path switching process illustrated in FIG. 1, even if the OSPF (Open Shortest Path First) protocol capable of high-speed switching is used, it takes at least about 10 seconds to change the communication paths dynamical using a routing protocol, as a process for securing the consistency of the entire routers and the like is required.

In addition, in a case of using the TCP protocol, when there is no confirmation response from a transmission destination node, a transmission source node performs a retransmitting process. The interval time set for performing the retransmitting process doubled each time the retransmitting process is performed.

FIG. 2 is a diagram illustrating the interval between retransmitting processes in the inter-application communication.

As illustrated in FIG. 2, the first retransmitting process is performed in one second after the transmitting process. The next transmission process is performed in two seconds after the first retransmitting process. In the same manner, next retransmitting processes are performed in 4 seconds and 8 seconds after the last retransmitting process.

For this reason, as illustrated in FIG. 2, even if the switching to an available communication path is completed, the retransmitting process may not be performed immediately. In the case of the example in FIG. 2, after the completion of the switching to an available communication path, the retransmitting process is not performed until after another 8 seconds.

As a result, when a trouble occurs in a communication path in a network, the inter-application communication is discontinued for a long time.

(2) To Detect a Trouble Speedily by Shortening the Trouble Detection Time in the Inter-Application Communication FIG. 3 and FIG. 4 are diagrams illustrating retransmitting processes in which the interval between retransmitting processes in the inter-application communication is shortened.

As illustrated in FIG. 3, when the retransmission interval is set at a fixed value shorter than the time required between the detection of a trouble and the completion of the switching of the communication path, the transmission source node may detect a trouble by mistake before the completion of the switching of the communication path. In this case, the high reliability expected with the redundant configuration of the network cannot be enjoyed.

Furthermore, when the retransmission process is performed at a short interval, the transmission source node performs the retransmission process many times during the switching of the communication path, resulting in the transmission of a large volume of retransmission data from the transmission source node, pressing on the communication band and increasing the CPU load of the transmission source node.

In addition, as illustrated in FIG. 4, when there is a temporary delay in the processing by the application at the transmission destination node, the transmission source node also makes a misjudgment that a trouble has occurred at the transmission destination node or in the transmission path.

Thus, when the interval between retransmission processes, i.e., the trouble detection time is shortened, the transmission source node detects a trouble by mistake.

(3) To Improve the System Continuation Rate During a Network Failure at the Server Side by Making a Node Operating as a Server Redundant In order to realize high reliability for a node operating as a server, clustering is performed with a plurality of nodes, parts (hardware, software) in each node and network communication devices for each node are made redundant, and a process for switching a currently-used device, i.e., active node is performed when a failure occurs in one of the nodes, as a general practice.

FIG. 5 is a diagram illustrating an example of the redundant configuration for a node operating as a server.

A node X, node Y and node Z illustrated in FIG. 5 form a clustered structure. The node X is the active node. The node Y and node Z are waiting devices, i.e., stand-by nodes. Meanwhile, the node X, node Y and node Z forming the clustered structure performs mutual communication monitoring through a router #5.

For example, when a communication trouble is detected in node X, one of the stand-by node Y and node Z (in this case, the node Y for which a higher priority has been set in advance) is switched to the active node.

However, when there are a plurality of stand-by nodes to be the switching target, it is difficult to determine the best node for continuing the inter-application communication with the transmission source node, only by the trouble detection at the server side.

For example, if there is a communication trouble between a router #4 and the node Y when the active node is switched from the node X to the node Y, the inter-application communication cannot be continued.

In order to solve the above problems, in inter-application communication that is communication performed between nodes connected and made available for communication with two or more communication paths independent from each other and is performed between a first application operating on a first node and a second application operating on a second node, the program disclosed herein makes the first node perform processes by transmitting a same packet simultaneously to all the communication paths, the processes including: a trouble monitoring session establishing process in which, when a request for establishment of an inter-application communication session for performing communication between the first application and the second application is received from the first application, whether or not a trouble monitoring session for monitoring a communication trouble has already been established between a first communication control unit that operates on the first node and controls at least communication of the first application and a second communication control unit that operates on the second node and controls at least communication of the second application is checked, and when the trouble monitoring session has not been established, a request for establishing the trouble monitoring session is performed to the second communication control unit and the trouble monitoring session is established; an inter-application communication session establishing process in which, when the trouble monitoring session has been established, a request for establishing the inter-application communication session is performed to the second application and the inter-application communication session is established; and a trouble monitoring communication process in which trouble monitoring communication is performed using only necessary information for trouble monitoring in the trouble monitoring session and at a shorter interval than an interval between retransmission processes in which, when a response is not received from the second application for a predetermined period of time in the inter-application communication session, a communication packet having same contents is transmitted again to the second application.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating inter-process communication.

FIG. 5 is a diagram illustrating inter-process communication.

FIG. 6 is a diagram illustrating an example of a system configuration realizing inter-application communication.

FIG. 7 is a diagram illustrating a connection environment during inter-application communication.

FIG. 12 is a diagram illustrating a configuration example of a control table used in a communication control unit of a client node.

FIG. 13 is a diagram illustrating a configuration example of a control table used in a communication control unit of a server node.

FIG. 14 is a block diagram illustrating a main configuration realizing a server node or a client node.

FIG. 18 is a flowchart illustrating processes performed by an environment creation/setting unit of a communication control unit in a client node.

FIG. 28 is a diagram illustrating the effect of a system according to the embodiment.

FIG. 33 is a diagram illustrating a variation example of the system configuration realizing inter-application communication.

FIG. 34 is a diagram illustrating an example of a control table for a client in the system configuration illustrated in FIG. 33.

DESCRIPTION OF EMBODIMENTS

Figure 1:
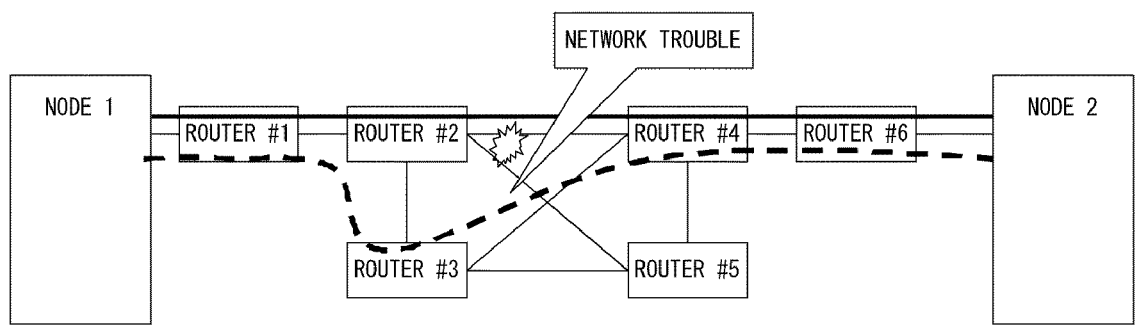
FIG. 1 is a diagram illustrating inter-process communication.
Figure 2:
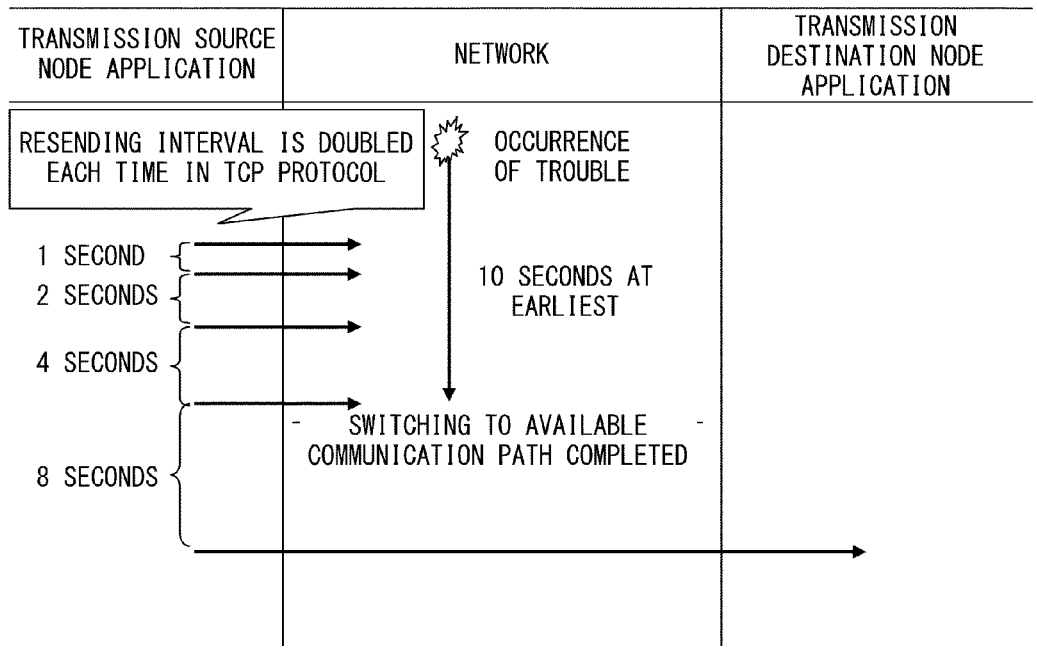
FIG. 2 is a diagram illustrating inter-process communication.
Figure 4:
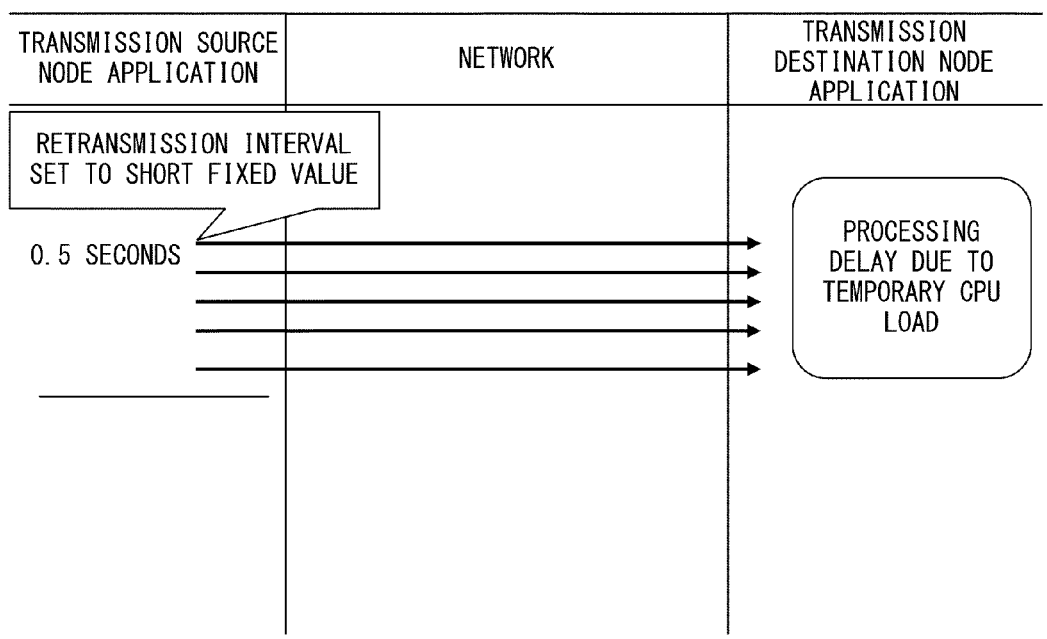
FIG. 4 is a diagram illustrating inter-process communication.

Hereinafter, the embodiment of the present invention is described with reference to FIG. 6 through FIG. 34.

FIG. 6 is a diagram illustrating an example of a system configuration realizing inter-application communication according to the embodiment.

A system 100 has a node 110 operating as a client, nodes 120 and 130 operating as a server, and networks 140 and 141 that are independent from each other. Hereinafter, the node operating as a client is referred to as a "client node", and the node operating as a server is referred to as "server node".

The client node 110 and the server node 120 are connected and made available for communication through the networks 140 and 141. In the same manner, the client node 110 and the server node 130 are connected and made available for communication through the networks 140 and 141.

The client node 110 is an information processing apparatus that has, at least, a CPU for executing a predetermined program, a memory for temporarily storing a program and data, a storage apparatus for storing the program and data, and a communication apparatus for connecting to the network and performing communication.

In the example in FIG. 6, the client node 110 is executing applications A and B that perform inter-application communication.

The client node 110 realizes a communication control unit 111 that performs communication control required for the realization of the inter-application communication according to the embodiment by making a predetermined program operate on the OS (operating system).

In the same manner, the server nodes 120 and 130 are, for example, an information processing apparatus that has, at least, a CPU for executing a predetermined program, a memory for temporarily storing a program and data, a storage apparatus for storing the program and data, and a communication apparatus for connecting to the network and performing communication.

In the example in FIG. 6, the server node 120 is executing an application C that performs inter-application communication and the server node 130 is executing an application D that performs inter-application communication.

The server node 120 realizes a communication control unit 121 that performs communication control required for the realization of the inter-application communication according to the embodiment by making a predetermined program operate on the OS. In the same manner, the server node 130 realizes a communication control unit 131 that performs communication control required for the realization of the inter-application communication according to the embodiment by making a predetermined program operate on the OS.

In addition, the server node 120 and the server node 130 are connected to each other through a router #00 and made available for communication. The server node 120 and the server node 130 perform mutual communication to monitor if the server node being their communication destination has a trouble or not. Hereinafter, the monitoring by means of the communication is referred to as "trouble monitoring between server nodes".

The network 140 has routers #01 through #4, and connects an NIC (network interface card) of the client node 110 and NICs of the server nodes 120 and 130. In the same manner, the network 141 has routers #11 through #14 and connects an NIC of the client node 110 and the NICS of the server nodes 120 and 130.

The communication control unit 111 is operating on the OS that operates on the client node 110. In the same manner, the communication control unit 121 is operating on the OS that operates on the server node 120, and the communication control unit 131 is operating on the OS that operates on the server node 130.

The applications A and B are operating on the OS that operates on the client node 110. In the same manner, the application C is operating on the OS that operates on the server node 120, and the application D is operating on the OS that operates on the server node 130.

However, the configuration of the client node 110 is not limited to the case in which the two applications A and B are executed on the OS. For example, only the application A may be executed on the OS, or two or more applications that perform inter-application communication may be executed on the OS. The same applies to the server nodes 120 and 130.

In addition, while FIG. 6 illustrates a case in which the two server nodes 120 and 130 form a clustered structure, the configuration is not limited to the case. For example two or more server nodes may form a clustered structure.

In configuration described above, the application A and the application C perform inter-application communication through the communication control unit 111, the networks 140 and 141, and the communication control unit 121. The application A and the application D perform inter-application communication through the communication control unit 111, the networks 140 and 141, and the communication control unit 131.

In the same manner, the application B and the application C perform inter-application communication through the communication control unit 111, the networks 140 and 141, and the communication control unit 121. The application B and application D perform inter-application communication through the communication control unit 111, the networks 140 and 141, and the communication unit 131.

In addition, apart from the inter-application communication described above, the communication control unit 111 and the communication control unit 121 perform communication through the networks 140 and 141 to monitor if the node being their communication destination or the network has a trouble or not. Hereinafter, the monitoring by means of the communication is referred to as "trouble monitoring between client/server nodes". The communication is referred to as "trouble monitoring communication."

FIG. 7 is a diagram illustrating a connection environment during the inter-application communication according to the embodiment.

When conducting the inter-application communication, it is performed after an inter-application communication session is established between application that perform the inter-application communication.

For example, when the application A performs the inter-application communication with the application C, the application A establishes an inter-application communication session with the application C. When the application A performs the inter-application communication with the application D, the application A establishes an inter-application communication session with the application D.

In the same manner, when the application B performs the inter-application communication with the application C, the application B establishes an inter-application communication session with the application C. When the application B performs the inter-application communication with the application D, the application B establishes an inter-application communication session with the application D.

When conducting the trouble monitoring communication, it is performed after a trouble monitoring session is established between the communication control units that perform the trouble monitoring communication. The establishment of the trouble monitoring session is performed before the inter-application communication session is established first. In other words, only one trouble monitoring session is established for each communication control unit operating on the OS on which the application performing the inter-application communication is operating.

For example, before an inter-application communication session is established between the application A and the application C, or between application B and the application C, one trouble monitoring session is established between the communication control unit 111 of the client node 110 and the communication control unit 121 of the server node 120.

In the same manner, before an inter-application communication session is established between the application A and the application D, or between application B and the application D, one trouble monitoring session is established between the communication control unit 111 of the client node 110 and the communication control unit 131 of the server node 130.

FIG. 7 illustrates a case in which one OS is operating respectively in the client node 110, the server nodes 120 and 130. Since the communication control units 111, 121 and 131 are realized by making a predetermined program operate on the OS, one trouble monitoring session is established respectively between the client node 110 and the server node 120, and between the client node 110 and the server node 130. However, the configuration is not limited to the one illustrated in FIG. 7.

For example, when a plurality of OSs operate on the sever node 120, the a trouble monitoring session is established between the communication control unit 111 of the client node 110 and the communication control units that operate on the respective OSs in the server node 120.

Figure 8:
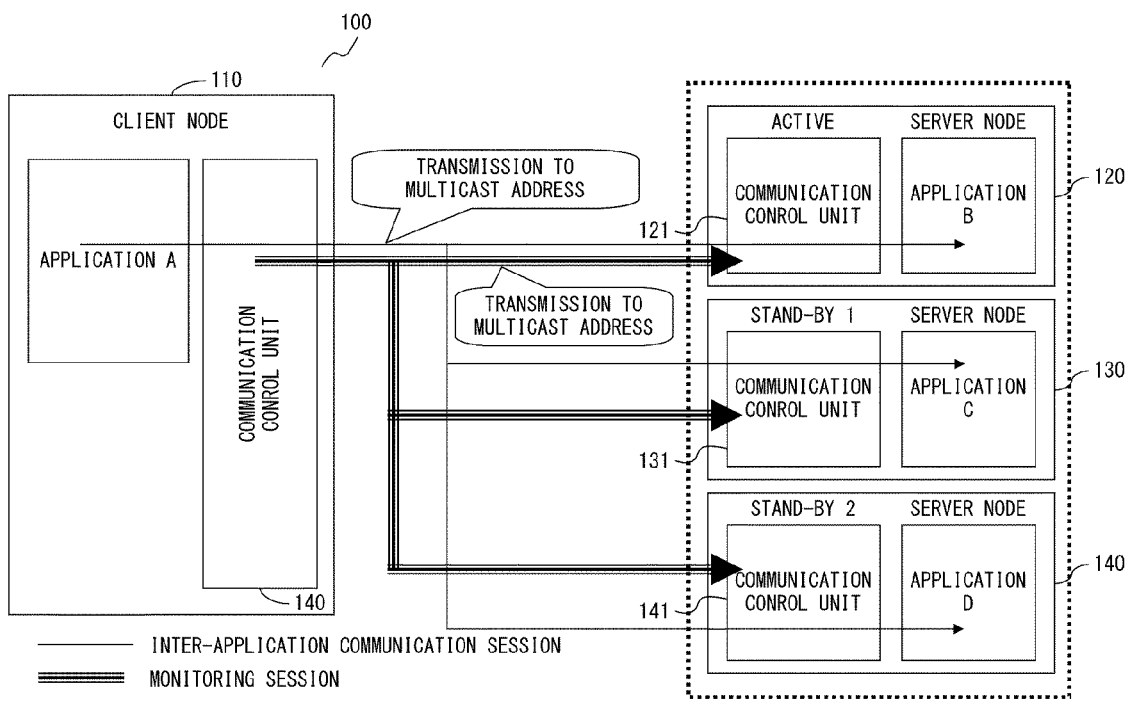
FIG. 8 is a diagram illustrating the flow of a communication packet.

FIG. 8 is a diagram illustrating the flow of a communication packet according to the embodiment. FIG. 8 illustrates the flow of a communication packet transmitted from the application A of the client node 110.

In FIG. 8, the server node has a triplex structure in which a server node 1 in the active state and a server node 2 and a server node 3 in the stand-by state are clustered. The numbers such as STAND-BY "1" and STAND-BY "2" represent the priority in switching to active.

The application A transmits a communication packet specifying a multicast IP address, in an inter-application communication session. The application B illustrated in FIG. 6 and other figures does the same.

Therefore, for example, when the same multicast IP address is set for the server nodes 120, 130 and 140, the communication packet transmitted from the application A is received by the applications C, D and E as illustrated in FIG. 8.

In the same manner, the communication control unit 111 transmits a communication packet specifying a multicast IP address, in a trouble monitoring session. Therefore, for example, when the same multicast IP address is set for the server nodes 120, 130 and 140, the communication packet transmitted from the communication control unit 111 is received by the communication control units 121, 131 and 141 as illustrated in FIG. 8.

According to this embodiment, the same transmission packet is transmitted to the two networks 140 and 141 that are independent from each other as illustrated in FIG. 6. Therefore, the applications C, D and E and the communication control units 121, 131 and 141 perform processes for the communication packet that is received first, and does not perform any process when they receive the same communication packet later, or discard the received communication packet.

Hereinafter, a communication packet in the trouble monitoring session is referred to as a "monitoring packet", a monitoring packet transmitted from a client node to a server node is referred to as a "monitoring request packet", and a monitoring packet transmitted from a server node to a client node is referred to as a "monitoring response packet".

Thus, while the communication destination in the inter-application communication session is virtualized as the application C of the server node 120 in the active state, the actual communication destination of the inter-application communication session is the applications C, D and E of the server nodes 120, 130 and 140.

In the same manner, while the communication destination in the trouble monitoring session is virtualized as the communication control unit 121 of the server node 120 in the active state, the actual communication destination of the trouble monitoring session is the communication control units 121, 131 and 140.

Here, for example the number of server nodes to be multiplexed, the number of the OSs and applications that operate on each server node are not limited to the configuration illustrated in FIG. 8.

Figure 9:
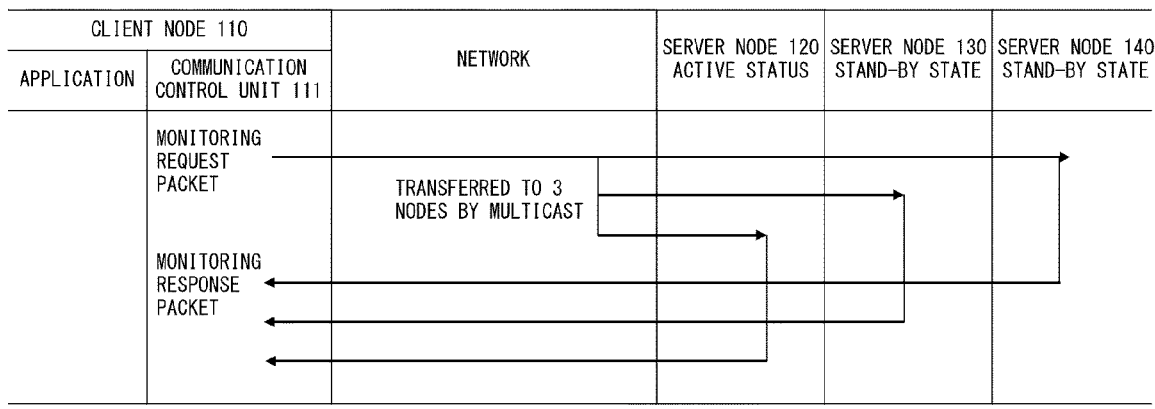
FIG. 9 is a diagram illustrating the flow of a communication packet in a trouble monitoring session.

FIG. 9 is a diagram illustrating the flow of a communication packet in a trouble monitoring session according to the embodiment.

FIG. 9 illustrates the flow of a communication packet in a trouble monitoring session that is transmitted from a communication control unit in a client node to a server node.

The communication control unit 111 of a client node 110 transmits a monitoring request packet specifying a multicast IP address. When the server nodes form the cluster illustrated in FIG. 8 and the multicast IP address is set to the servers, the monitoring request packet is transmitted to the server nodes 120, 130 and 140.

When the communication control units 121, 131 and 141 of the server nodes 120, 130 and 140 receive the monitoring request packet transmitted from the communication control unit 111, they operate in conjunction with I/O interruption, and transmit a monitoring response packet to the communication control unit 111.

The transmission/reception process of a monitoring packet is performed at an interval of about several tens to several hundreds mS that is shorter than the interval between retransmission processes to be performed when using the TCP protocol.

Figure 10:
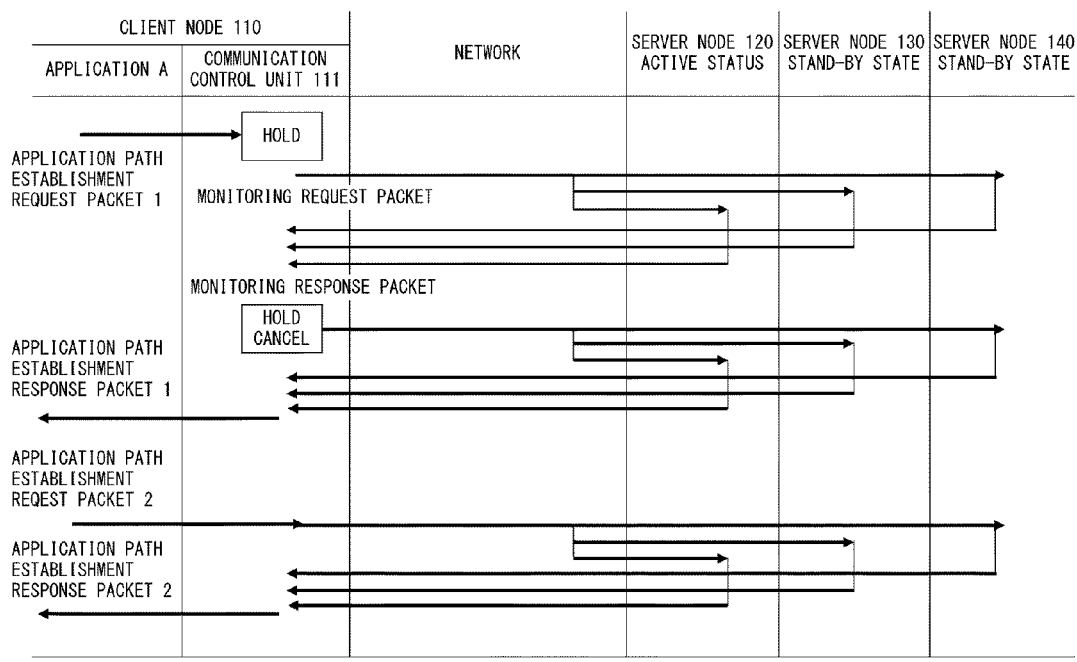
FIG. 10 is a diagram illustrating the relationship between an inter-application communication session and the trouble monitoring session.

FIG. 10 is a diagram illustrating a relation between an inter-application communication session and a trouble monitoring session according to the embodiment.

The application A operating on the client node 110 instructs, in order to request the establishment of an inter-application communication session with, for example, the application C operating on the server node 120, the communication control unit 111 to transmit a communication packet 1 for establishing an inter-application communication session.

Hereinafter, the request for the establishment of an inter-application communication session is referred to as an "application path establishment request" and a communication packet for requesting the establishment of an inter-application communication session is referred to as an "application path establishment request packet", as needed.

Then, the communication control unit 111 temporarily holds the application path establishment request 1 from the application A. In other words, the communication control unit 111 temporarily puts the establishment of the inter-application communication session on hold.

The communication control unit 111 transmit the monitoring request packet specifying a multicast IP address, and request the establishment of a trouble monitoring session to the communication control units 121, 131 and 141 operating on the server nodes 120, 130 140, simultaneously.

When the communication control units 121, 131 and 141 operating on the server nodes 120, 130 140 receive the monitoring request packet from the communication control unit 111, they respectively perform a predetermined process in order to establish a trouble monitoring session with the communication control unit 111. Then, when they complete the predetermined process for establishing a trouble monitoring session, the communication control units 121, 131 and 141 respectively transmit a monitoring response packet to the communication control unit 111.

When a trouble monitoring session is established by the above processes between the communication control unit 111 and the communication control unit 121, between the communication control unit 111 and the communication control unit 131 and between the communication control unit 111 and the communication control unit 141, the communication control unit 111 cancels the hold of the transmission of the application path establishment request packet 1 transmitted from the application A to the server node, transmits simultaneously the application path establishment request packet 1 specifying a multicast IP address.

When the applications C, D and E operating on the server nodes 120, 130 and 140 receive the application path establishment request packet 1 from the communication control unit 111, they perform a predetermined process for establishing an inter-application communication session with the application A.

Then, when the predetermined process for establishing an inter-application communication session is completed, the applications C, D and E respectively transmits, to the application A, a communication packet for responding and telling that an inter-application communication session has been established in response to the application path establishment request packet 1.

Hereinafter, the communication packet for responding and telling that an inter-application communication session has been established is referred to as an "application path establishment response packet" as needed, When the communication control unit 111 receives the application path establishment response packet 1 transmitted from the applications C, D and E, it transmits the received application path establishment response packet 1 to the application A.

An inter-application communication session is established by the above processes between the application A and the application C, between the application A and the application D, and between the application A and the application E.

If a trouble monitoring session has already been established between the communication control unit 111 and the communication control unit 121, between the communication control unit 111 and the communication control unit 131, and between the communication control unit 111 and the communication control unit 141, the communication control unit 111 does not perform the process for establishing a trouble monitoring session.

Therefore, when the communication control unit 111 receives an application path establishment request packet 2 from the application B, it does not temporarily holds the transmission of the application path establishment request packet 2, and transmits simultaneously the application path establishment request packet 2 specifying a multicast IP address, to establish an inter-application communication session between the application B and the application C, between the application B and the application D and between the application B and the application E.

Figure 11:
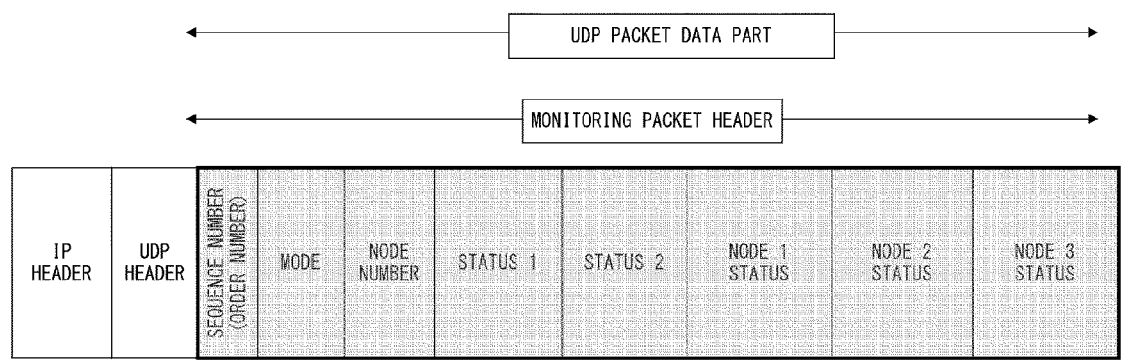
FIG. 11 is a diagram illustrating a configuration example of a monitoring packet used for the trouble monitoring session.

FIG. 11 is a diagram illustrating a configuration example of a monitoring packet used for the trouble monitoring session according to the embodiment.

The communication in the trouble monitoring session according to the embodiment is performed in accordance with the UDP protocol. The monitoring packet is generated by setting a monitoring packet header in a data part in a UDP packet. Since the UDP packet is a known art, only the monitoring packet header is explained below.

The monitoring packet header has a sequence number (order number), a mode, a node number, a status 1, status 2, node 1 status, node 2 status, and node 3 status.

The sequence number is a sequential number that is the sequence number of a last transmitted monitoring request packet incremented by 1 each time a monitoring request packet is transmitted from the communication control unit 111 of the client node 110. The communication control unit of a server node that received a monitoring request packet sets the sequence number of the received monitoring request packet when it transmits a monitoring response packet.

The mode represents the type of the communication path. The communication path is, for example, a communication path established by an inter-application communication session, or a communication path established by a trouble monitoring session, which is set by the communication control unit 111, 121, 131 or 141, at the time of the monitoring packet transmission. For example, "0" represents an application communication path, and "1" represents a trouble monitoring path.

Hereinafter, a communication path established by an inter-application communication session is referred to as an "application communication path", and a communication path established by a trouble monitoring session is referred to as a "trouble monitoring path".

The node number, a status 1, status 2, node 1 status, node 2 status, and node 3 status are setting that is valid when the mode is the trouble monitoring path.

For example when there are three server nodes that receive a communication packet with which the same multicast IP address is specified, "1" represents a server node 1, "2" represents a server node "2", and "3" represents a server node 3.

The status 1 represents the status of a server node that received the monitoring request packet, which is information set at the time of the transmission of a monitoring response packet. For example, "1" indicates that the node is the active node, and an integer value of "2" or larger indicates that the node is in the stand-by status. The integer value represents the priority order in switching to the active node.

The status 2 indicates whether there is a change in the status of the server node that received the monitoring request packet, which is information set at the time of the transmission of a monitoring response packet.

For example, "0" indicates that there is no change in the status of the node, "1" indicates that the status of the node is being changed from stand-by to active, and "2" indicates that the change of the status of the node from the stand-by to active has been completed.

The node 1 status represents the communication status with the server node 1. For example, "1" indicates that the communication with the server node 1 is normal and "2" indicates that a trouble has been detected in the communication with the server node 1. The same applies to the node 2 status and the node 3 status.

Hereinafter, the node 1 status, node 2 status and node 3 status are collectively referred to as the "node status".

While FIG. 11 illustrates a case in which there are three server nodes that receive a communication packet with which the same multicast IP address is specified, the configuration is not limited to the case. The value to be set in the status 1, the number of the node statuses may be changed as needed, in accordance with the number of server nodes that receives a communication packet with which the same multicast IP address is specified.

FIG. 12 is a diagram illustrating a configuration example of a control table used in the communication control unit 111 of the client node 110 according to the embodiment. Hereinafter, a control table used in the communication control unit of a client node 110 is referred to as "client control table".

The client control table illustrated in FIG. 12 has a multicast IP address, a port number, a transmission sequence number and a recipient list.

The multicast IP address is a multicast IP address that is set commonly for the destination server node to which a monitoring request packet is transmitted simultaneously. The port number is the number assigned to a communication port of the destination server nodes. The transmission sequence number is a sequence number that is incremented only by 1 every time a monitoring request packet is transmitted.

The multicast IP address, port number and transmission sequence number is set by the communication control unit 111 in the monitoring packet header at the time of the transmission of the monitoring request packet.

The recipient list is a list of information related to a server node that has transmitted a monitoring response packet in response to the monitoring request packet transmitted while specifying a multicast IP address. Since FIG. 12 illustrates a case with the configuration illustrated in FIG. 8, the server node 120 of the node number 1, the server node 130 of the node number 2, and the server node 140 of the node number 3 are registered in the recipient list.

Here, the recipient list has the node number of a server node that has transmitted a monitoring response packet, the IP address of a server node that has transmitted a monitoring response packet, the status 1, status 2 and node status that are set in the monitoring packet header of the monitoring response packet, and the number of unreceived monitoring response packet.

FIG. 13 is a diagram illustrating a configuration example of a control table used in the communication control units 121, 131 and 141 of the server nodes 120, 130 and 140 according to the embodiment. Hereinafter, the control table used in the communication control unit of a server node is referred to as a "server control table".

The server control table illustrated in FIG. 13 has a transmission source IP address, a transmission source port number, a multicast IP address, a port number, a reception sequence number, a request unreception number, a node number, status 1 and status 2, and node statuses of other nodes.

The transmission source IP address is the IP address of the transmission source of a received monitoring request packet. The transmission source port number is the number assigned to the communication port of the transmission source of the received monitoring request packet.

The multicast IP address is the multicast IP address assigned to the node. The port number is the number of the communication port of the node. The reception sequence number is the sequence number set in the monitoring packet header of the received monitoring request packet. The request unreception number is the number of the times a monitoring request packet is not received. The node number is the number of the node.

The status 1 and status 2 are the status 1 and status 2 set in the received monitoring request packet. The node statuses of other nodes represent a communication trouble of other server nodes that is detected by a trouble monitoring between server nodes illustrated in FIG. 27.

FIG. 14 is a block diagram illustrating a main configuration for realizing the client node 11o or the server nodes 120, 130 and 140 according to the embodiment. Since the client node 110 and the sever nodes 120, 130 and 140 have the similar configuration, FIG. 14 illustrates the client node 110.

As explained with FIG. 6, the client node 110 according to the embodiment has the applications A and B that perform inter-application communication, the communication control unit 111 that performs communication control required for realizing the inter-application communication according to the embodiment, and the OS for operating for the applications A, B and the communication control unit 111.

Meanwhile, the applications A, B, communication control unit 11 and OS are realized by a CPU of the client node 110 executing instructions of a predetermined program using a memory and the like as needed.

The applications A and B are software that operates on the OS. However, the applications respectively perform inter-application communication using an API (application program interface) provided by the communication control unit 111.

For example, a communication packet output from each application is passed to the OS through the communication control unit 111. Then, the OS transmits the communication packet to the network through a network I/F of the client node 110.

While FIG. 14 illustrates a case in which the two applications A and B are operating on the OS, the configuration is not limited to the case. For example only one application may be operating, or three or more applications may be operating. However, even when three or more application operate on the OS, all applications perform communication using an API provided by the communication control unit 111.

The communication control unit 111 is software that operates on the OS. The communication control unit 111 provides an application for inter-application communication operating on the OS on which the communication control unit 111 is operating with an API.

The communication control unit 111 has an inter-application communication session processing unit 710 that performs an inter-application communication session process in response to a request from the application A or B, a trouble monitoring session processing unit 720 that performs a trouble monitoring session process, and a common control unit 730 that performs a transmission/reception process of a communication packet.

The inter-application communication session processing unit 710 has an environment creation/setting API 711 that is an interface to a processing unit that creates/sets the communication environment, an environment creation/setting processing unit 712 that is a processing unit creating/setting the communication environment, a packet transmission API 713 that is an interface to a processing unit that transmits a communication packet, and a packet reception API 714 that is an interface to a processing unit that receives a communication packet.

When the application A or B requests the environment creation/setting processing unit 712 to establish an inter-application communication session through the environment creation/setting API 711, the environment creation/setting processing unit 712 establishes a socket used to the inter-application communication, and creates and sets the communication environment by performing the assignment of required resources, a port number and an IP address for the established socket.

In addition, the environment creation/setting processing unit 712 notifies a trouble monitoring session processing unit 720 of the reception of the request for the establishment of an inter-application communication session. At the same time, the environment creation/setting processing unit 712 generates the control tables used for the inter-application such as the ones illustrated in FIG. 12 and FIG. 13 in a control table storage unit 731.

The trouble monitoring session processing unit 720 performs a transmission/reception process of a communication packet including a monitoring packet with the destination with which the trouble monitoring session has been established, using a packet transmission processing unit 732 and a packet reception processing unit 733.

When the trouble monitoring session processing unit 720 receives the notification of the reception of the request for the establishment of an inter-application communication session from the environment creation/setting processing unit 712, the trouble monitoring session processing unit 720 temporarily puts the process for establishing an inter-application communication session on hold.

Then, the trouble monitoring session processing unit 720 communicates with the communication control unit operating on the OS on which the destination application with which the inter-application communication session has been established is operating, using the packet transmission processing unit 732 and the packet reception processing unit 733, and performs a process for establishing a trouble monitoring session with the communication control unit operating on the OS on which the destination application with which the inter-application communication session has been established is operating.

When the trouble monitoring session is established, the trouble monitoring session processing unit 720 communicates with destination application with which the inter-application communication session has been established according to the request from the application A or B using the packet transmission processing unit 732 and the packet reception processing unit 733, to establish an inter-application communication session.

The common control unit 730 has a control table storage unit 731 that stores a control table illustrated in FIG. 12 or FIG. 13, a packet transmission processing unit 732 that performs a transmission process of a communication packet, and a packet reception processing unit 733 that performs a reception process of a communication packet.

The packet transmission processing unit 732 performs a process to transmit a communication packet to a server node in accordance with a request from the application A or B transmitted through the packet transmission API 713, or a request from the trouble monitoring session processing unit 720.

When the packet reception processing unit 733 receives a communication packet through a network I/F such as an NIC and the OS, it transmits the received communication packet to the application A or B, or the trouble monitoring session processing unit 720 depending on whether an inter-application communication session is performed or a trouble monitoring session is performed.

In addition to the above configuration, the server nodes 120, 130 and 140 has a high reliability operation processing unit 740 that manages the server nodes 120, 130 and 140 that form a cluster.

Between the server nodes forming a cluster, trouble monitoring between server nodes is performed. A trouble detected by the trouble monitoring between server nodes is transmitted to the high reliability operation processing unit 740. Upon receiving the notification, the high reliability operation processing unit 740 transmits notifies the other server nodes forming the cluster of the trouble.

Figure 15:
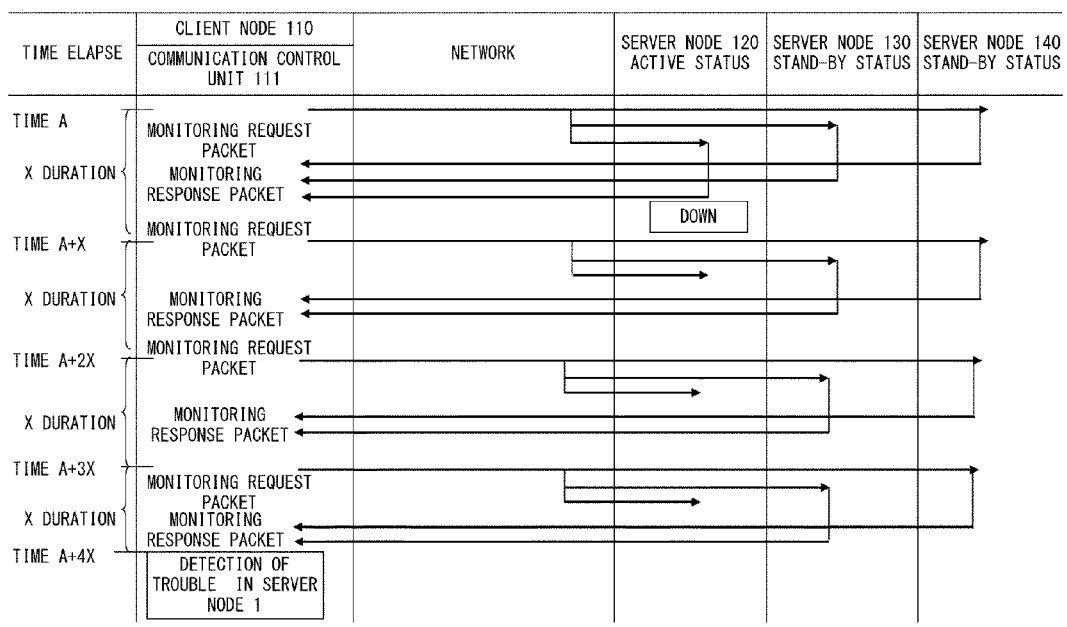
FIG. 15 is a diagram illustrating the outline of a process until a client node detects a trouble with a server node.

FIG. 15 is a diagram illustrating the outline of a process until the client node 110 according to the embodiment detects a trouble in the server node 120.

In order to make the explanation simple, illustrated is a case in which the communication control unit 111 of the client node 110 and the communication control unit 121 of the server node 120 establishes a trouble monitoring session at the time A, and after that, a transmission/reception process of a monitoring packet is performed between the communication control unit 111 and the communication control unit 121 at an interval of duration X. The same applies to FIG. 14 and FIG. 15.

If the server node 120 breaks down after the completion of the transmission of a monitoring response packet in response to a monitoring request packet transmitted from the communication control unit 111 at time A, the communication control unit 111 does not receive a monitoring response packet from the server node 120 in response to a monitoring request packet transmitted from the communication control unit 111 after that.

In this regard, when a monitoring response packet in response to a monitoring request packet is not received before the transmission of a next monitoring request packet, it is determined that the monitoring response packet is unreceived.

In this embodiment, if a monitoring response packet remains unreceived for three times, it is determined that the server node 120 from which the monitoring response packet is unreceived has a trouble. In the example in FIG. 15, the communication control unit 111 determines the occurrence of a trouble in the server node 120 at time A+4X.

Figure 16:
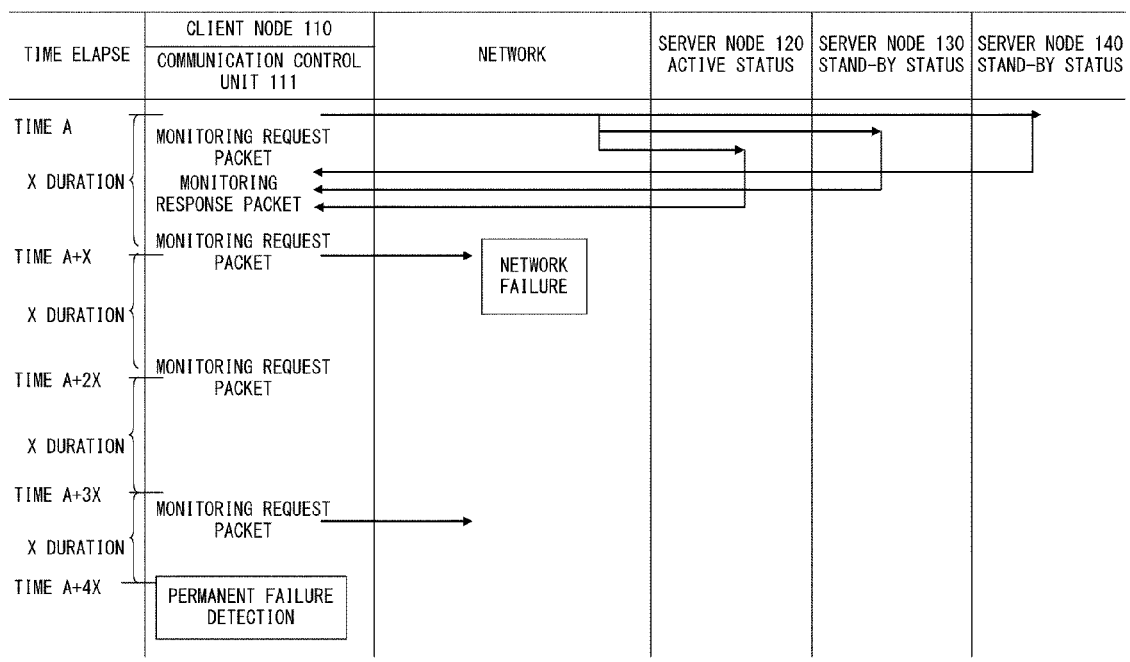
FIG. 16 is a diagram illustrating a process until the system detects a permanent failure.

FIG. 16 is a diagram illustrating a process until the system 100 according to the embodiment detects a permanent failure.

When a failure occurs in the network of all systems between the client node 110 and the server nodes 120, 130 and 140 after the completion of the transmission of a monitoring response packet in response to the monitoring request packet transmitted from the communication control unit 111 at time A, a monitoring request packet transmitted after that from the communication control unit 111 does not reach the server nodes 120, 130 and 140.

Therefore, the communication control unit 111 does not receive any monitoring response packet from the server nodes 120, 130 and 140 in response to a monitoring request packet transmitted from the communication control unit 111 after the occurrence of the network failure.

In this embodiment, when any monitoring response packet is not received from all server nodes three times in a row, the communication control unit 111 determines that a failure has occurred in the network. Hereinafter the failure is referred to as a "permanent failures". In the example in FIG. 16, the communication control unit 111 determines the occurrence of the permanent failure at time A+4X.

Figure 17:
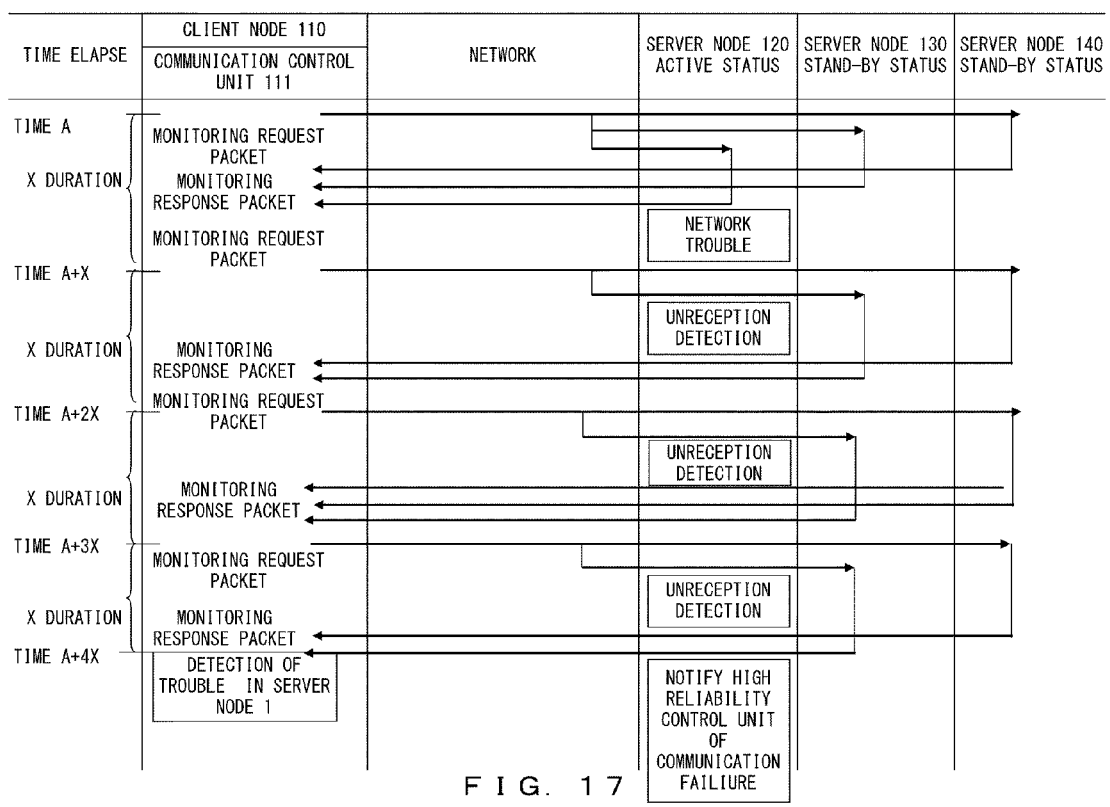
FIG. 17 is a diagram illustrating a process until a server node detects a communication trouble with a client node.

FIG. 17 is a diagram illustrating a process until the server node 120 detects a communication trouble with the client node 110 in the system 100 according to the present invention.

When a trouble occurs in the network between the client node 110 and the server node 120 after the completion of the transmission of a monitoring response packet in response to the monitoring request packet transmitted from the communication control unit 111 at time A, a monitoring request packet transmitted from the communication control unit 111 after that does not reach the server node 120.

In the server node 120, when any monitoring request packet is not received from the communication control unit 111 until the duration X has elapsed after the time A at which the trouble monitoring session has been established, it is determined that a monitoring request packet is unreceived.

In this embodiment, when any monitoring request packet is not received three times in a row, it is determined that a trouble has occurred in the network between the client node 110 and the server node 120. In the example of FIG. 17, the server node 120 determines the occurrence of a trouble in the network between the client node 110 and the server node 120 at time A+4X.

FIG. 18 is a flowchart illustrating processes performed by the environment creation/setting unit 712 of the communication control unit 111 in the client node 110 according to the embodiment.

The environment creation/setting unit 712 receives a request for the establishment of an inter-application communication session from an application in step S1301, and it determines whether or not the requested inter-application communication session has already been established.

When the requested inter-application communication session has not been established yet, the environment creation/setting unit 712 moves the process forward to step S1302 (step S1301, NO).

In the step S1302, the environment creation/setting unit 712 temporarily puts the process for establishing the requested inter-application communication session on hold.

In step S1303, the environment creation/setting unit 712 requests the trouble monitoring session processing 720 to establish a trouble monitoring session with the communication control unit that is operating on the OS on which another application being the target of the request from the application for the establishment of the inter-application communication session is operating.

In step S1304, the environment creation/setting unit 712 determines whether or not the process in the step S1303 has been completed normally and a trouble monitoring session has been established. If the establishment of a trouble monitoring session has failed, the environment creation/setting unit 712 moves the process forward to step S1309 (step S1304, NO). Meanwhile, when the establishment of a trouble monitoring session has been successful, the environment creation/setting unit 712 moves the step forward to step S1305 (step S1304, YES).

In step S1305, the environment creation/setting unit 712 performs the process for establishing an inter-application communication session that has been temporarily put on hold in the process of the step S1302. Then, after the completion of the inter-application communication session, the environment creation/setting unit 712 moves forward to step S1308 to complete the process.

Meanwhile, if the requested inter-application communication session has already been established in the step S1301, the environment creation/setting unit 712 moves the process forward to step S1306 (step S1301, YES).

In step S1306, the environment creation/setting unit 712 determines whether or not the communication status with the target of the established inter-application communication session is normal. For example, the environment creation/setting unit 712 refers to a client control table stored in the control table storage unit 731, and then obtains the value set in the node status of the target of the established inter-application communication session registered in the recipient list in the client control table.

When the obtained value is "1", the environment creation/setting unit 712 determines that the communication status is normal. When the obtained value is "2" the environment creation/setting unit 712 determines that the communication status is abnormal.

When the communication status is determined as normal in the step S1306, the environment creation/setting unit 712 moves the process forward to the step S1307 (step S1306 YES). Then, in step S1307, the environment creation/setting unit 712 establishes an inter-application communication session with the target application of the establishment of the inter-application communication.

When the communication status is determined as abnormal in the step S1306, the environment creation/setting unit 712 moves the process forward to the step S1309 (step S1306, NO). Then, in the step S1309, the environment creation/setting unit 712 notifies the application of the detection of a permanent failure, and completes the process.

Figure 19:
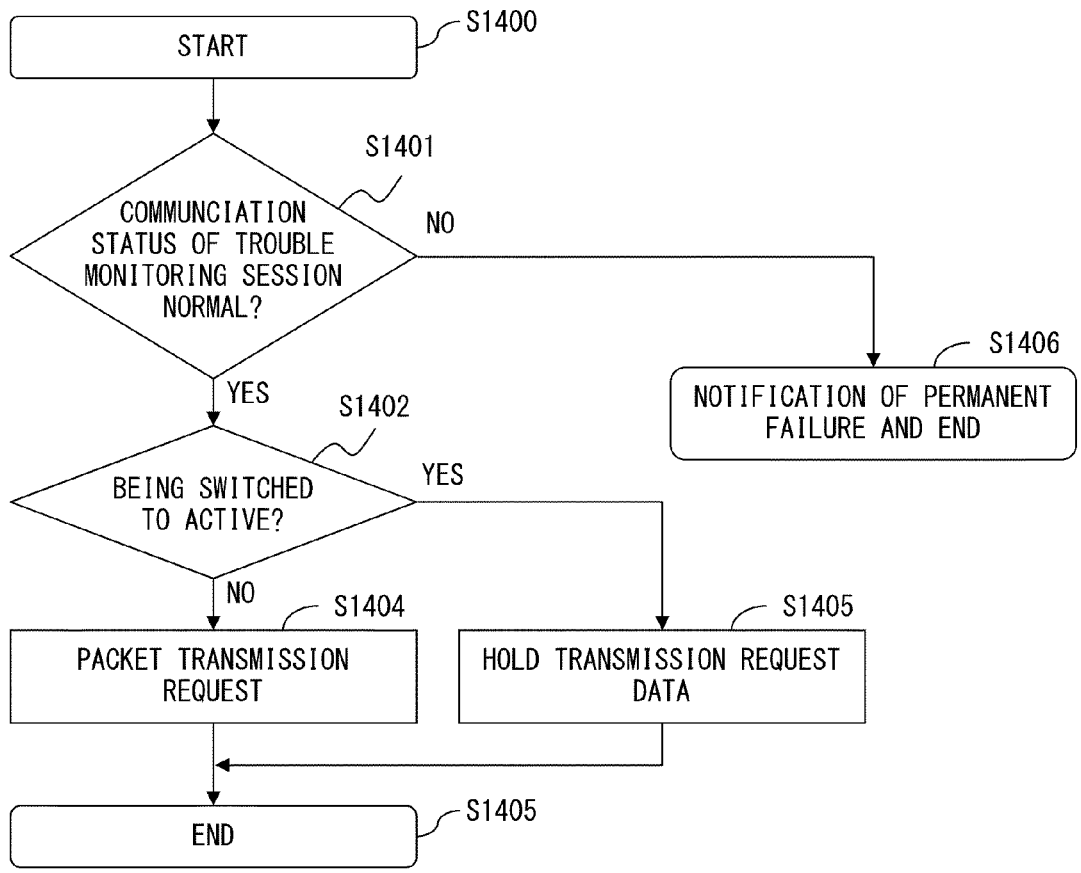
FIG. 19 is a flowchart illustrating a packet transmission process performed by a communication control unit in a client node.

FIG. 19 is a flowchart illustrating a packet transmission process performed by the communication control unit 111 in the client node 110 according to the embodiment.

The packet transmission API 713 receives a transmission request from a communication packet from the application in step S1401, and refers to the client control table stored in the control table storage unit 731 to obtain the value registered in the node status of the node of the IP address being the packet transmission destination registered in the recipient list of the client control table.

When the obtained value is "1", the packet transmission API 713 determines that the communication status is normal. When the obtained value is "2", the packet transmission API 713 determines that the communication status is abnormal.

When the communication status is determined as abnormal in the step S1401, the packet transmission API 713 moves the process forward to step S1402 (step S1401, YES).

In the step S1402, the packet transmission API 713 determines whether or not the node being the destination of the packet transmission is being changed to the active status. At this time, the packet transmission API 713 refers to the client control table that it referred to in the step S1401, to obtain the value set in the status 2 of the he node of the IP address being the packet transmission destination registered in the recipient list of the client control table.

When the obtained value is "1", the packet transmission API 713 determines that the change from the stand-by status to the active status is being performed, and moves the process forward to step S1403 (step S1402, YES).

In the step S1403, the packet transmission API 713 puts the transmission request of a communication packet to the packet transmission processing unit 732 on hold for a predetermined time, and moves the process forward to step S1405. Then, after the predetermined time has passed, the packet transmission processing unit 732 starts the process from the step S1401.

Meanwhile, in the step S1402, when the obtained value is other than "1", the packet transmission API 713 determines that the change from the stand-by status to the active status is not being performed, and moves the process forward to step S1404 (step S1402, NO).

In the step S1404, the packet transmission API 713 requests the packet transmission processing unit 732 to transmit the communication packet according to the request from the application. The packet transmission processing unit 732 then moves to step S1405 to complete the process.

Meanwhile, when the communication status is determined as abnormal in the step S1401, the packet transmission API 713 moves the process forward to step S1406 (step S1401, NO).

In the step S1406, the packet transmission processing unit 732 determines that there is a permanent failure, and release the inter-application communication that has already been established with the destination of the packet transmission. Then, the packet transmission processing unit 732 notifies the application of the detection of the permanent failure, and completes the process.

Figure 20:
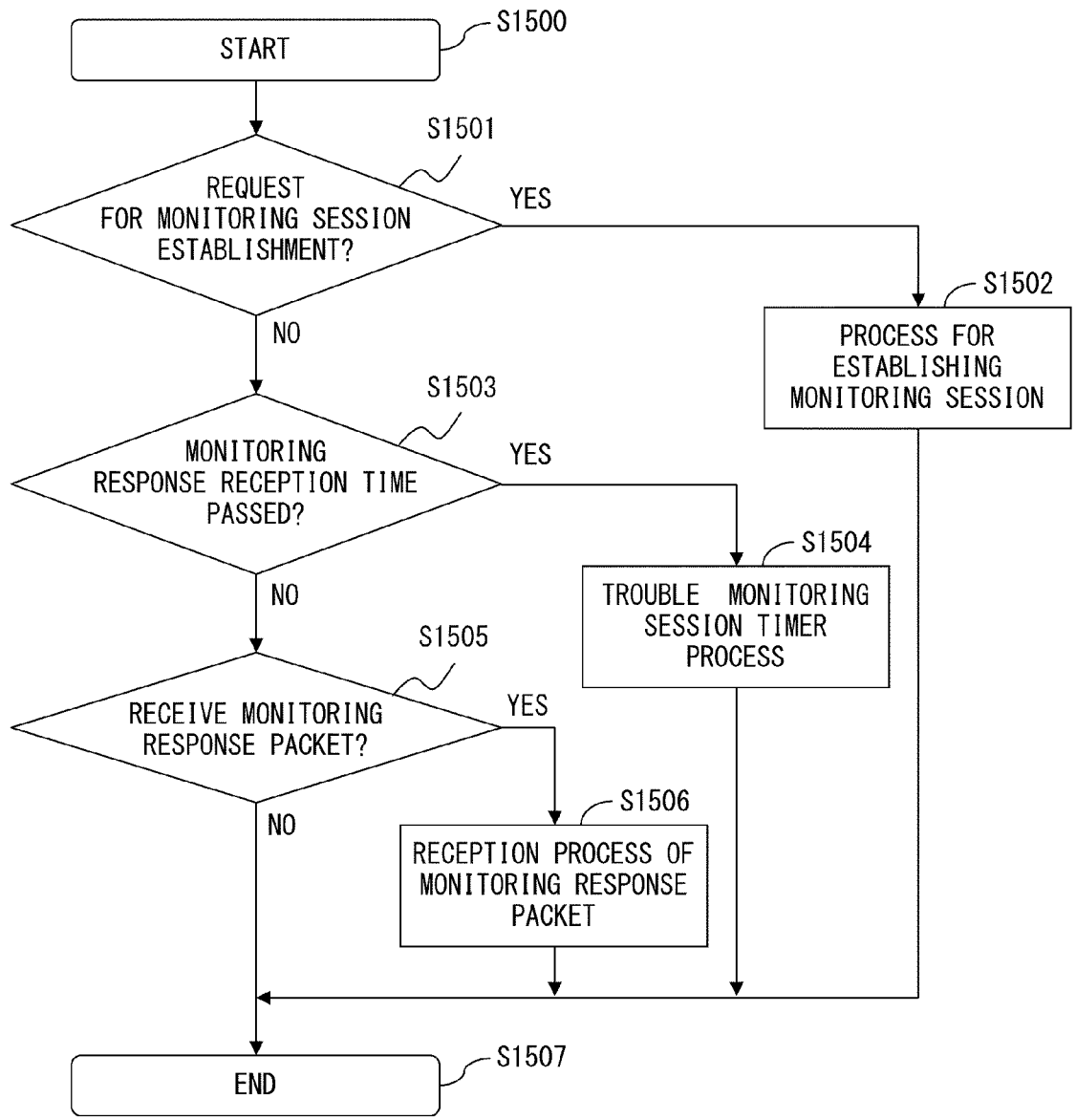
FIG. 20 is a flowchart illustrating the outline of a transmission/reception process of a monitoring packet performed by a trouble monitoring session processing unit of a client node.

FIG. 20 is a flowchart illustrating the outline of a transmission/reception process of a monitoring packet performed by the trouble monitoring session processing unit 720 of the client node 110 according to the embodiment.

When, for example, the monitoring session processing unit 720 receives a request for the establishment of a trouble monitoring session from the environment creation/setting processing unit 712 as in the step S1303 illustrated in FIG. 18, the monitoring session processing unit 720 starts the process for establishing a trouble monitoring session.

In step S1501, the trouble monitoring session processing unit 720 determines whether or not the request from the environment creation/setting processing unit 712 is for the establishment of a trouble monitoring session. If the request is for the establishment of a trouble monitoring session, the trouble monitoring session processing unit 720 moves the process forward to step S1502 (step S1501, YES).

In the step S1502, the trouble monitoring session processing unit 720 performs the process for establishing a trouble monitoring session. When the establishment of the trouble monitoring session is completed, the trouble monitoring session processing unit 720 moves to step S1507 to complete the process for establishing the trouble monitoring session.

Meanwhile, when the request is not for the establishment of a trouble monitoring session in the step S1501, the trouble monitoring session processing unit 720 moves the process forward to step S1503 (step S1501, NO).

In the step S1503, the trouble monitoring session processing unit 720 determines whether or not a predetermined monitoring response reception time has passed or not. The monitoring response reception time refers to the period of time after the transmission of a monitoring request packet to wait for the reception of a monitoring response packet in response to the transmitted monitoring request packet (duration X in FIG. 15).

When the trouble monitoring session processing unit 720 determines that the monitoring response reception time has passed, it moves the process forward to step S1504 (step S1503 YES).

In the step S1504, the trouble monitoring session processing unit 720 performs a timer process for the trouble monitoring session processing unit 720 itself, in order to perform the process for the trouble monitoring session again after a predetermined period of time. Hereinafter, the time process is referred to as a "trouble monitoring session timer process". When the timer process is completed, the trouble monitoring session processing unit 720 moves to step S1507 to complete the process for establishing a trouble monitoring session.

Meanwhile, when the trouble monitoring session processing unit 720 determines that the monitoring response reception time has not passed, it moves the process forward to step S1505 (step S1503, NO).

In the step S1505, the trouble monitoring session processing unit 720 determines whether or not a monitoring response packet is to be received. When a monitoring response packet is to be received, the trouble monitoring session processing unit 720 moves the process forward to step S1506 (step S1505, YES).

In the step S1506, the trouble monitoring session processing unit 720 performs a reception process of a monitoring response packet. When the reception process of the monitoring response packet has been completed, the trouble monitoring session processing unit 720 moves to step S1507 to complete the process for establishing a trouble monitoring session.

Meanwhile, when a monitoring response packet is not to be received, the trouble monitoring session processing unit 720 moves to the step S1507 to complete the process for establishing a trouble monitoring session (step S1505, NO).

Figure 21:
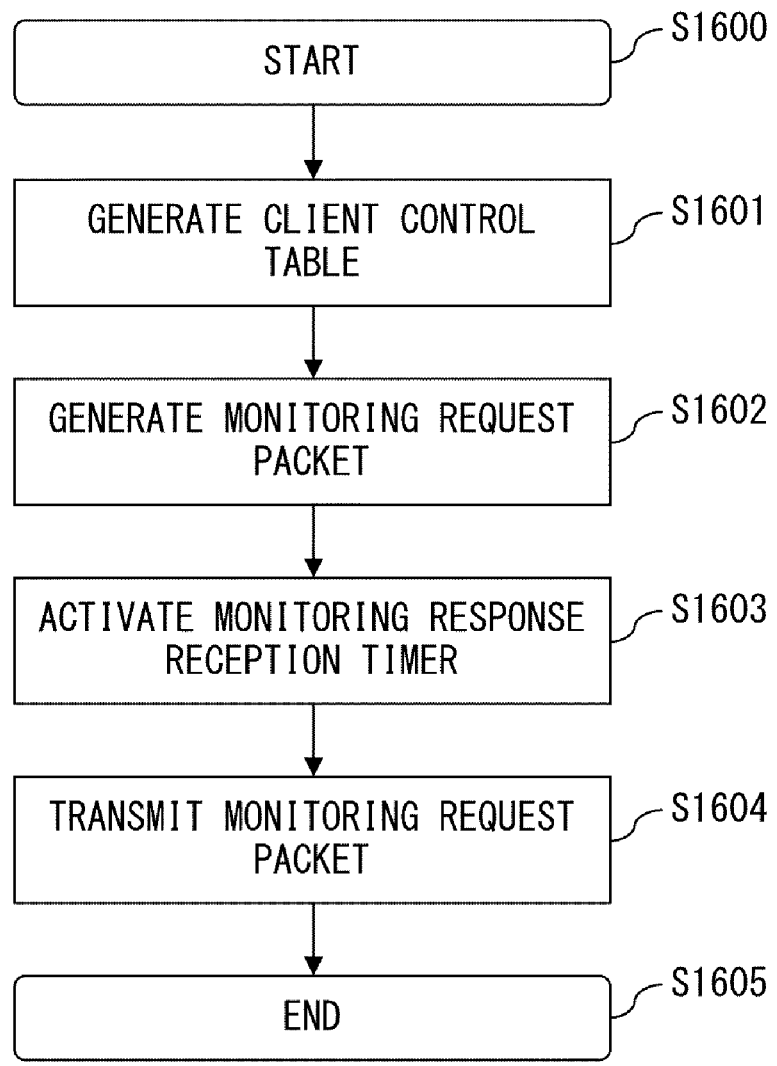
FIG. 21 is a flowchart illustrating a trouble monitoring session establishment process (step S1502) performed by the trouble monitoring session processing unit in a client node.

FIG. 21 is a flowchart illustrating a trouble monitoring session establishment process (step S1502) performed by the trouble monitoring session processing unit 720 in the client node 110 according to the embodiment.

In step S1601, the trouble monitoring session processing unit 720 generates a client control table illustrated in FIG. 12 in the control table storage unit 731.

For example the multicast IP address assigned to a plurality of server nodes including the server node being the target of the establishment of an inter-application communication session according to a request from an application and the communication port assigned commonly for the plurality of server nodes including the server node being the target of the establishment of an inter-application communication session according to the request from the application are set in the client control table.

In addition, since any monitoring response packet has not been received in the initial state, the reception sequence number is set to 0. Every time a monitoring response packet is received, the contents of the received monitoring response packet are registered in the recipient list.

In step S1602, the trouble monitoring session processing unit 720 generates a monitoring request packet illustrated in FIG. 11.

For example, the trouble monitoring session processing unit 720 generates data in which a required area is secured, and generates an IP header and a UDP header by setting necessary information such as the multicast IP address. Further, the trouble monitoring session processing unit sets 1 as the sequence number of the monitoring packet header part, and sets 1 as the mode.

In step S1603, the trouble monitoring session processing unit activates a monitoring response reception timer. In other words, the trouble monitoring session processing unit 720 sets a monitoring response reception time in the timer so that a next reception process of a monitoring response packet is performed after the monitoring response reception time passes.

In step S1604, the trouble monitoring session processing unit request the packet transmission processing unit 732 to transmit the monitoring request packet generated in the step S1602. Then, the packet transmission processing unit 732 performs a transmission process of the monitoring request packet according to the request from the trouble monitoring session processing unit 720.

Figure 22:
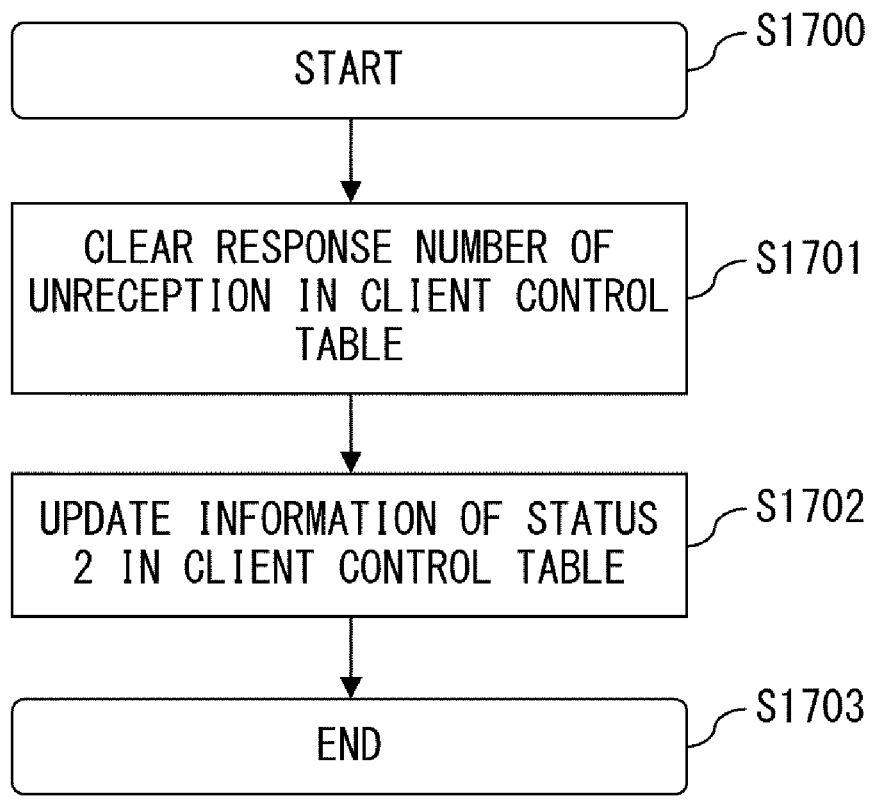
FIG. 22 is a diagram illustrating a reception process (step S1506) of a monitoring response packet performed by the trouble monitoring session processing unit in a client node.

FIG. 22 is a diagram illustrating a reception process (step S1506) of a monitoring response packet performed by the trouble monitoring session processing unit 720 in the client node 110 according to the embodiment.

In step S1701, the trouble monitoring session processing unit 720 receives a monitoring response packet, and refers to the IP header part of the monitoring response packet to obtain the IP address of the transmission source. Then, the trouble monitoring session processing unit 720 refers to the recipient list in the client control table stored in the control table storage unit 731, and when there is a node corresponding to the obtained IP address, sets the number of response unreception of the node to 0.

If any node corresponding to the obtained IP address is not registered in the recipient list, the trouble monitoring session processing unit 720 registers a new node in the recipient list in accordance with the received monitoring response packet.

In step S1702, the trouble monitoring session processing unit 720 obtains the value of the status 2 illustrated in FIG. 11 from the received response packet. Then, the trouble monitoring session processing unit 720 refers to the recipient list in the client control table and updates the information of the status 2 of the node corresponding to the IP address obtained in the step S1701 using the value of the status 2 obtained from the monitoring response packet.

Figure 23:
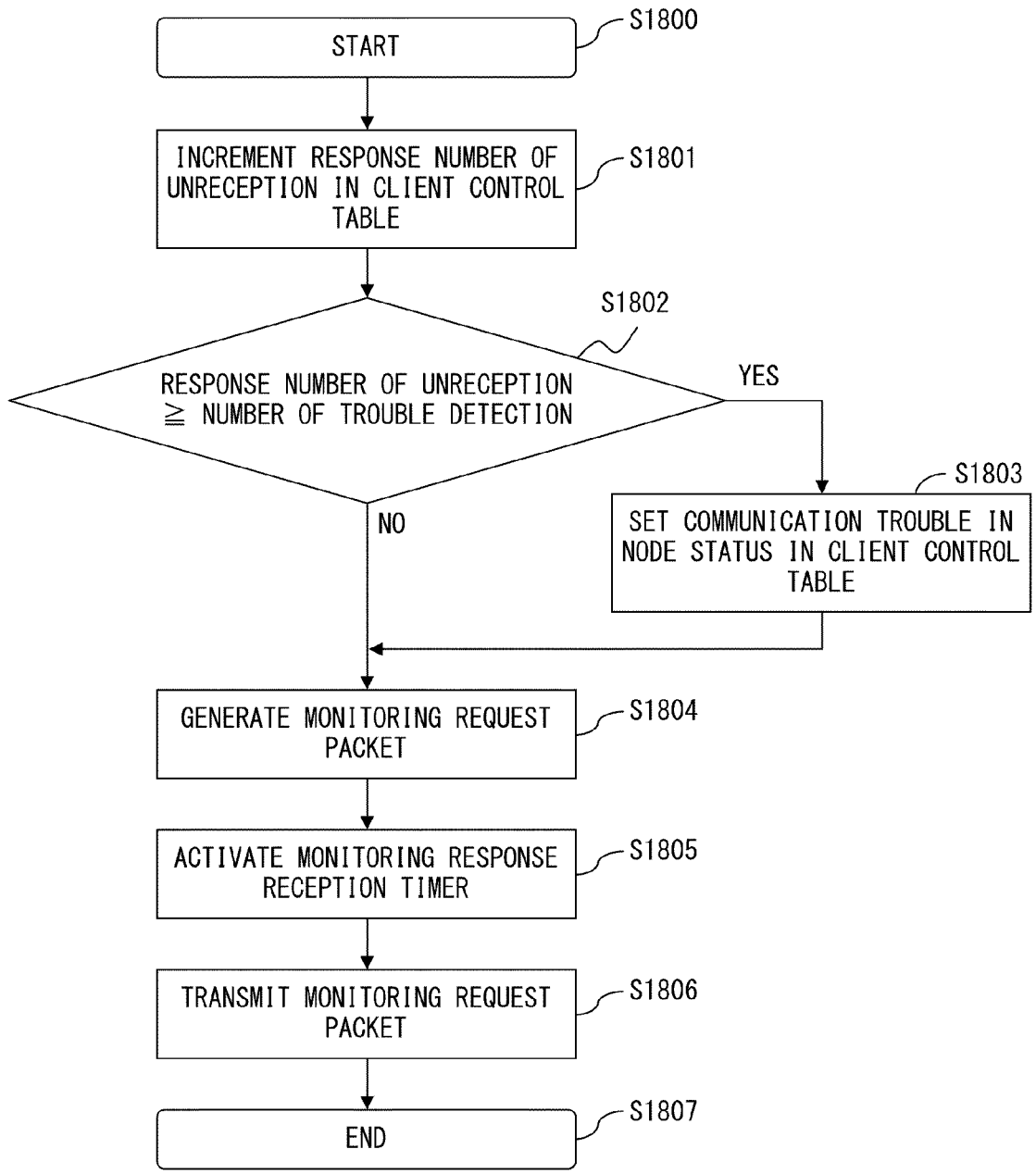
FIG. 23 is a diagram illustrating a trouble monitoring session timer process (S1504) performed by the trouble monitoring session processing unit in a client node.

FIG. 23 is a diagram illustrating a trouble monitoring session timer process (S1504) performed by the trouble monitoring session processing unit 720 in the client node 110 according to the embodiment.

In step S1801, the trouble monitoring session processing unit 720 refers to the recipient list in the client control table stored in the control table storage unit 731, and increments, by one, the number of response unreception of the node from which any monitoring response packet has not been received after the monitoring response reception time passed.

In step S1802, the trouble monitoring session processing unit 720 compares the number of response unreception calculated in the step S1801 and a predetermined number of trouble detection. When the number of response unreception is equal to or more than the number of trouble detection, the trouble monitoring session processing unit 720 moves the process forward to step S1803 (step S1802, YES). In FIG. 15 and so on, the case in which the number of trouble detection is three has been explained.

In step S1803, the trouble monitoring session processing unit 720 sets a communication trouble in the node status of the node of which the number of response unreception was determined as equal to or more than the number of trouble detection. In this embodiment, "2" that indicates the communication trouble is set in the status 1.

Meanwhile, when the number of response unreception is less than the number of trouble detection, the trouble monitoring session processing unit 720 moves the process forward to step S1804 (step S1802, NO).

In step S1804, the trouble monitoring session processing unit 720 generates a monitoring request packet illustrated in FIG. 11. For example, the trouble monitoring session processing unit 720 generates data in which a required area is secured, and generates an IP header and a UDP header by setting necessary information such as the multicast IP address.

In addition, the transmission sequence number in the client control table is incremented by one, and the value after the increment is set as the sequence number of the monitoring packet header. In addition, 1 is set as the mode of the monitoring packet header.

Further, the value of the node status of the transmission destination node registered in the recipient list in the client control table is set as the node status of the monitoring packet header.

In step S1805, the trouble monitoring session processing unit 720 activates a monitoring response reception timer. In other words, the trouble monitoring session processing unit 720 sets a monitoring response reception time in the timer so that a next reception process of a monitoring response packet is performed after the monitoring response reception time passes.

In step S1806, the trouble monitoring session processing unit 720 request the packet transmission processing unit 732 to transmit the monitoring request packet generated in the step S1804. Then, the packet transmission processing unit 732 performs a transmission process of the monitoring request packet according to the request from the trouble monitoring session processing unit 720.

Figure 24:
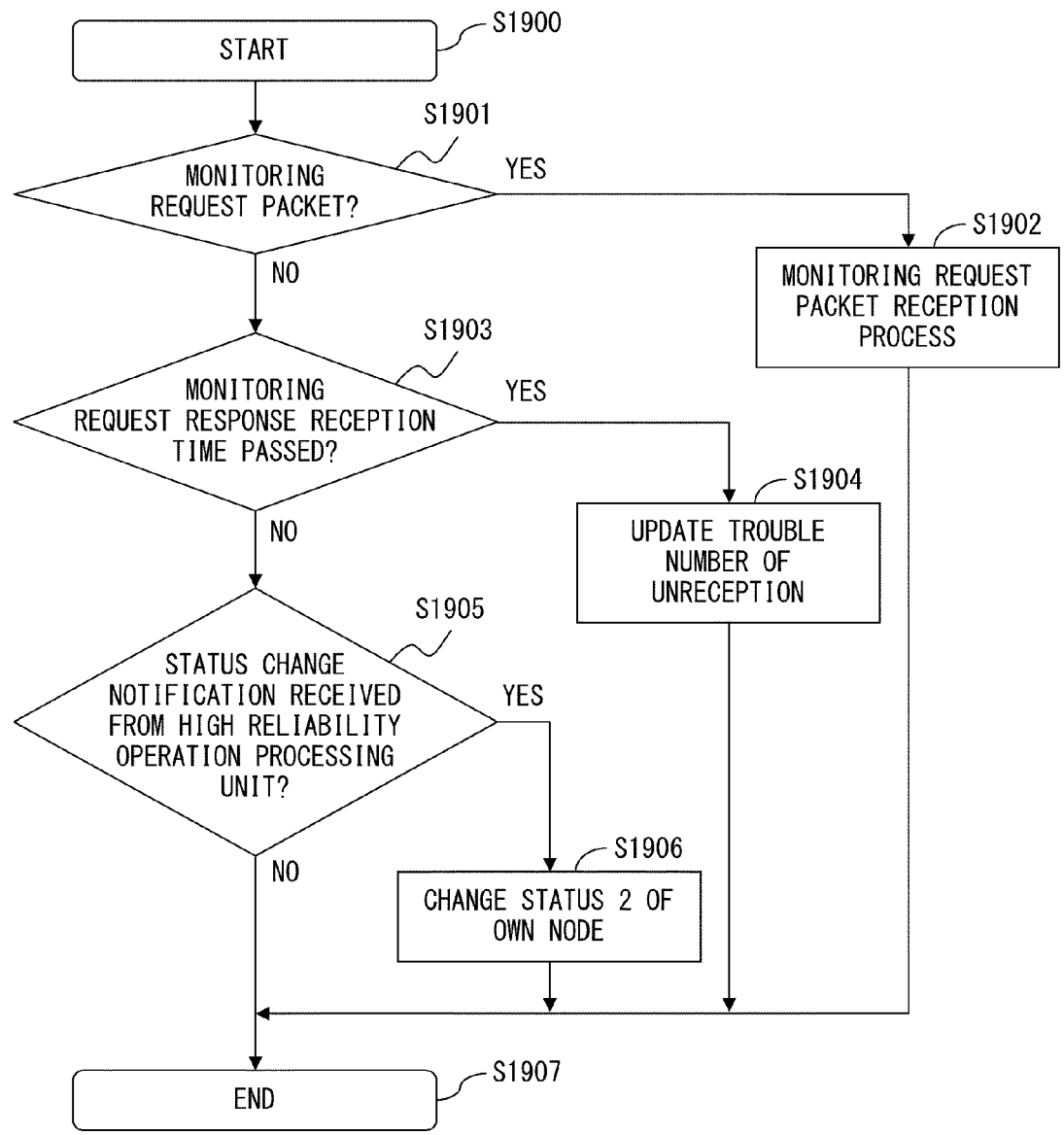
FIG. 24 is a flowchart illustrating an outline of a transmission/reception process of a monitoring packet performed by a trouble monitoring session processing unit in a server node.

FIG. 24 is a flowchart illustrating an outline of a transmission/reception process of a monitoring packet performed by the trouble monitoring session processing unit 720 in the server node 120, 130 or 140 according to the embodiment.

In step S1901, for example when the trouble monitoring session processing unit 720 receives a notification of the reception of a communication packet from the packet reception processing unit 733, the trouble monitoring session processing unit 720 determines whether or not the received communication packet is a monitoring request packet.

For example, the trouble monitoring session processing unit 720 refers to the monitoring packet header of the communication packet. When the mode in the monitoring packet header is set to the trouble monitoring path, the trouble monitoring session processing unit 720 determines that the received communication packet is a monitoring request packet, and moves the process forward to step S1902 (step S1901, YES).

In step S1902, the trouble monitoring session processing unit 720 performs a reception process of the monitoring request packet. When the reception process of the monitoring request packet is completed, the trouble monitoring session processing unit 720 moves to step S1907 to complete the transmission/reception process of the monitoring packet, Meanwhile, in step S1901, when the mode of in the monitoring packet header is not set to the trouble monitoring path, the trouble monitoring session processing unit 720 determines that the received communication packet is not a monitoring request packet, and moves the process forward to step S1903 (step S1901, NO).

In step S1903, the trouble monitoring session processing unit 720 determines where or not a predetermined monitoring request reception time has passed. The monitoring request reception time refers to the period of time after the reception of a monitoring request packet to wait for the reception of a next monitoring request packet in response (duration X in FIG. 17).

When the trouble monitoring session processing unit 720 determines that the monitoring request reception time has passed, it moves the process forward to step S1904 (step S1903 YES).

In step S1904, the trouble monitoring session processing unit 720 updates the number of unreception of the monitoring request packet. After the update of the number of unreception, the trouble monitoring session processing unit 720 moves to step S1907 to complete the transmission/reception process of the monitoring packet.

Meanwhile, when the trouble monitoring session processing unit 720 determines that the monitoring request reception time has not passed in the step S1903, it moves the process to step S1905 (step S1903, NO).

In step S1905, the trouble monitoring session processing unit 720 determines whether a status change notification ha been received from a high reliability operation processing unit 740. The high reliability operation processing unit 740 performs notification of the change of the status of the node by the processes in steps S2202, S2208, S2212 that are to be described later. For example, when the status of the server nodes 130 and 140 has been changed from the stand-by state to the active state, the high reliability operation processing unit 740 notifies the trouble monitoring session processing unit 720 of the change of the status of the node.

When the trouble monitoring session processing unit 720 receives the notification of the change of the status of the node from the high reliability operation processing unit 740, it moves the process forward to step S1906 (step S1905, YES).

In step S1906, the trouble monitoring session processing unit 720 sets the status in which the change from stand-by to active is being performed as the status 2 of its own node in the server control table stored in the control table storage unit. When the setting of the status 2 is completed, the trouble monitoring session processing unit 720 moves to the step S1907 to complete the transmission/reception process of the packet.

Meanwhile, when the trouble monitoring session processing unit 720 has not received a notification of the change of the status of the node from the high reliability operation processing unit 740 in step S1905, it moves the process to the step S1907 (step S1905 NO). The trouble monitoring session processing unit 720 then completes the transmission/reception process of the monitoring packet.

Figure 25:
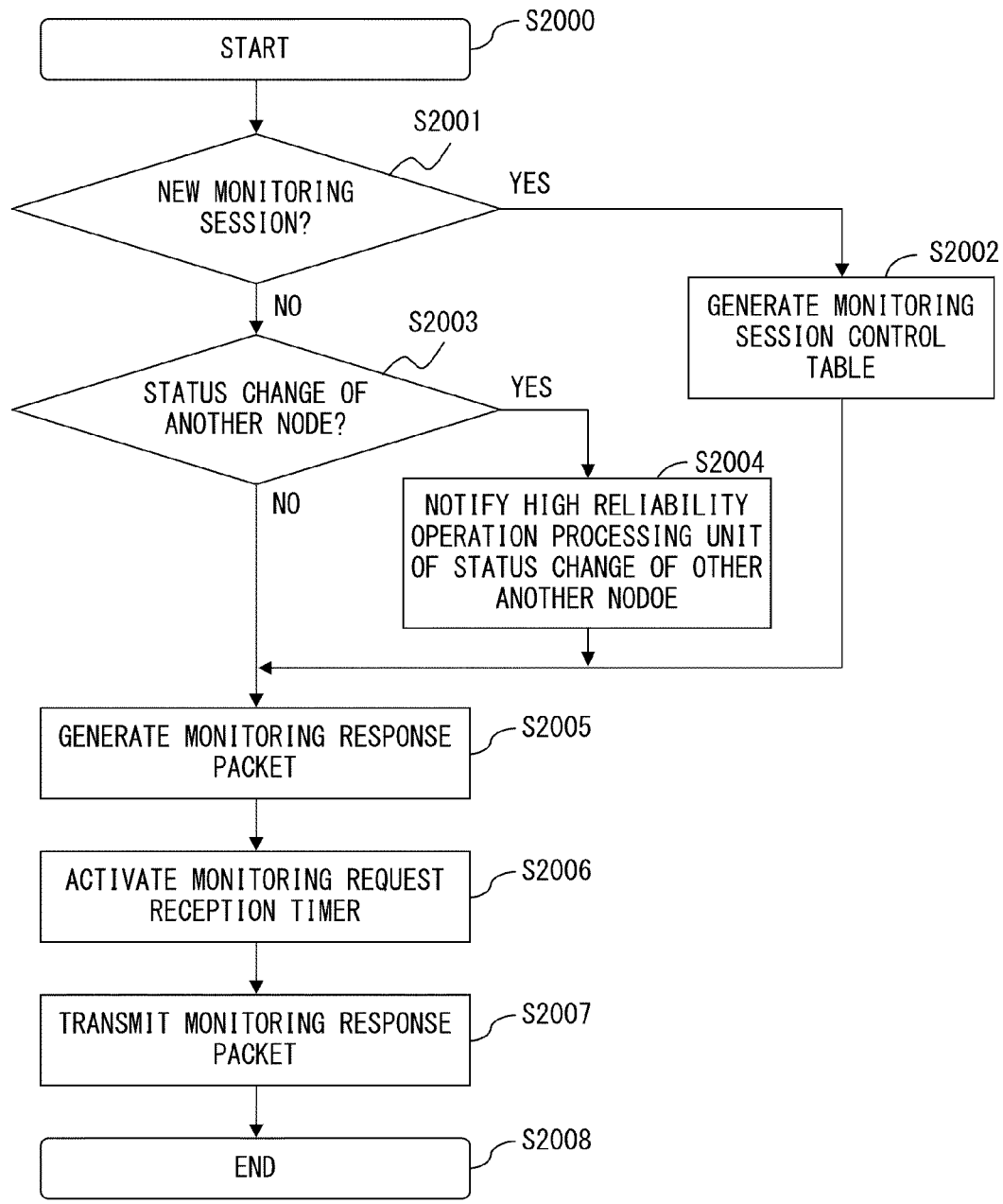
FIG. 25 is a flowchart of a reception process of a monitoring request packet (S1902) performed by the trouble monitoring session processing unit in a server node.

FIG. 25 is a flowchart of a reception process of a monitoring request packet (S1902) performed by the trouble monitoring session processing unit 720 in the server node 120, 130 or 140 according to the embodiment.

In step S 2001, the trouble monitoring session processing unit 720 determines whether the received monitoring request packet is for a new trouble monitoring session or not. For example, the trouble monitoring session processing unit 720 refers to the control table storage unit 731, and checks the presence/absence of a server control table for the IP address of the transmission source of the received monitoring request packet. When there is no server control table for the IP address of the transmission source of the received monitoring request packet, the trouble monitoring session processing unit 720 determines that the received monitoring request packet is for a new trouble monitoring session, and moves the process forward to step S2002 (step S2001, YES).

In step S2002, the trouble monitoring session processing unit 720 reads out necessary information from the header part of the received monitoring request packet, and generates a server control table illustrated in FIG. 13.

Meanwhile, in the step S2001, when there is a server control table for the IP address of the transmission source of the received monitoring request packet, the trouble monitoring session processing unit 720 determines that the received monitoring request packet is not for a new trouble monitoring session, and moves the process forward to step S2003 (S2001, NO).

In step S2003, the trouble monitoring session processing unit 720 determines whether or not there is a status change in another server node.

For example, the trouble monitoring session processing unit 720 refers to the server control table in the control table storage unit 731. The trouble monitoring session processing unit 720 then obtains the node status of nodes other than its own node registered in the other node status in the server control table. In addition, the trouble monitoring session processing unit 720 obtains the node status of nodes other than its own node from the monitoring packet header of the received monitoring request packet.

Then, the trouble monitoring session processing unit 720 compares the node status obtained from the server control table with the node status obtained from the monitoring request packet. When there is a difference in the node statuses, the trouble monitoring session processing unit 720 determines that the node status has been changed, and when there is no difference in the node statuses, it determines that the node status has not been changed.

When the trouble monitoring session processing unit 720 determines that there has been a status change in another node, it moves the process forward to step S2004 (step S2003, YES).

In the step S2004, the trouble monitoring session processing unit 720 notifies the high reliability operation processing unit 740 of the node of which status has been changed. In this case, the trouble monitoring session processing unit 720 performs the notification of, for example, the node of which status has been changed, and the status in which the node is being changed from stand-by to active, or the status in which the node is in the active status.

When the notification to the high reliability operation processing unit 740 has been completed, the trouble monitoring session processing unit 720 moves the process forward to step S2005.

Meanwhile, when the trouble monitoring session processing unit 720 determines that there is no status change in another node in the step S2003, the trouble monitoring session processing unit 720 moves the process forward to the step S2005 (step S2003, NO).

In the step S2005, the trouble monitoring session processing unit 720 generates a monitoring response packet illustrated in FIG. 11. For example, the trouble monitoring session processing unit 720 generates data in which a required area is secured, and generates an IP header and a UDP header by setting necessary information such as the multicast IP address. In addition, the sequence number of the received monitoring request packet is set as the sequence number of the monitoring packet header, and 1 is set as the mode. Further, the information in the server control table is reflected in the node number, status 1, status 2, and node status.

In step S2006, the trouble monitoring session processing unit 720 activates a monitoring request reception timer. In other words, the trouble monitoring session processing unit 720 sets a monitoring request reception time in the timer so that a next reception process of a next monitoring request packet is performed after the monitoring request reception time passes.

In step S2007, the trouble monitoring session processing unit 720 request the packet transmission processing unit 732 to transmit the monitoring response packet generated in the step S2005. Then, the packet transmission processing unit 732 performs a transmission process of the monitoring request packet according to the request from the trouble monitoring session processing unit 720.

Figure 26:
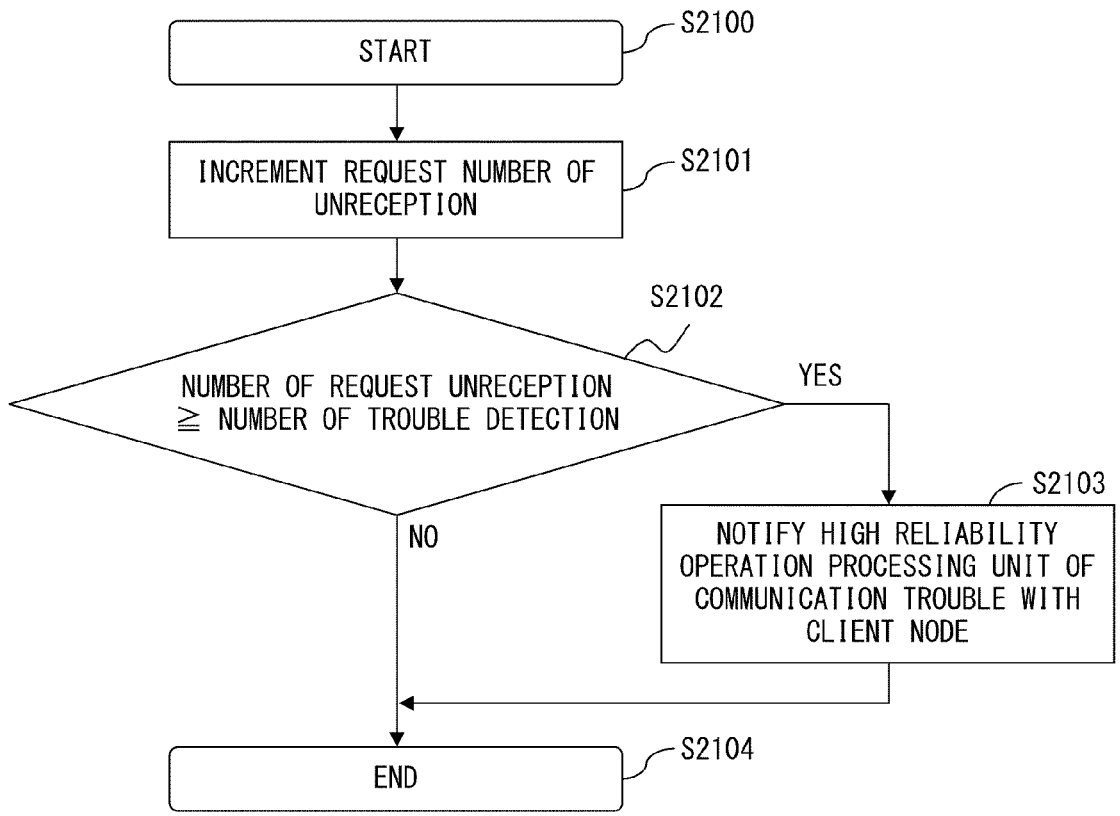
FIG. 26 is a flowchart illustrating an update process of the number of unreception (step S1904) performed the trouble monitoring session processing unit in a server node.

FIG. 26 is a flowchart illustrating an update process of the number of unreception (step S1904) performed by the trouble monitoring session processing unit 720 in the server node 120, 130 or 140 according to the embodiment.

In step S2101, the trouble monitoring session processing unit 720 obtains the number of request unreception in the server control table stored in the control table storage unit 731. Then, the trouble monitoring session processing unit 720 increments the obtained number of request unreception by one, and sets the value after the increment as the number of request unreception in the server control table.

In step S2102, the trouble monitoring session processing unit 720 compares the number of request unreception calculated in Step S2101 and a predetermined number of trouble detection. When the number of request unreception is equal to or more than the number of trouble detection, the trouble monitoring session processing unit 720 moves the process forward to step S2103 (step S2102, YES). In FIG. 17 and so on, the case in which the number of trouble detection is three has been explained.

In the step S2103, the trouble monitoring session processing unit 720 notifies the high reliability operation processing unit 740 of the detection of a communication trouble with the client node 110. When the notification to the high reliability operation processing unit 740 has been completed, the trouble monitoring session processing unit 720 moves to step S2104 to complete the reception process of the monitoring request packet.

Meanwhile, when the number of request unreception is less than the number of trouble detection, the trouble monitoring session processing unit 720 moves the process forward to the step S2104 (step S2102 NO), and completes the update process of the number of unreception.

Figure 27:
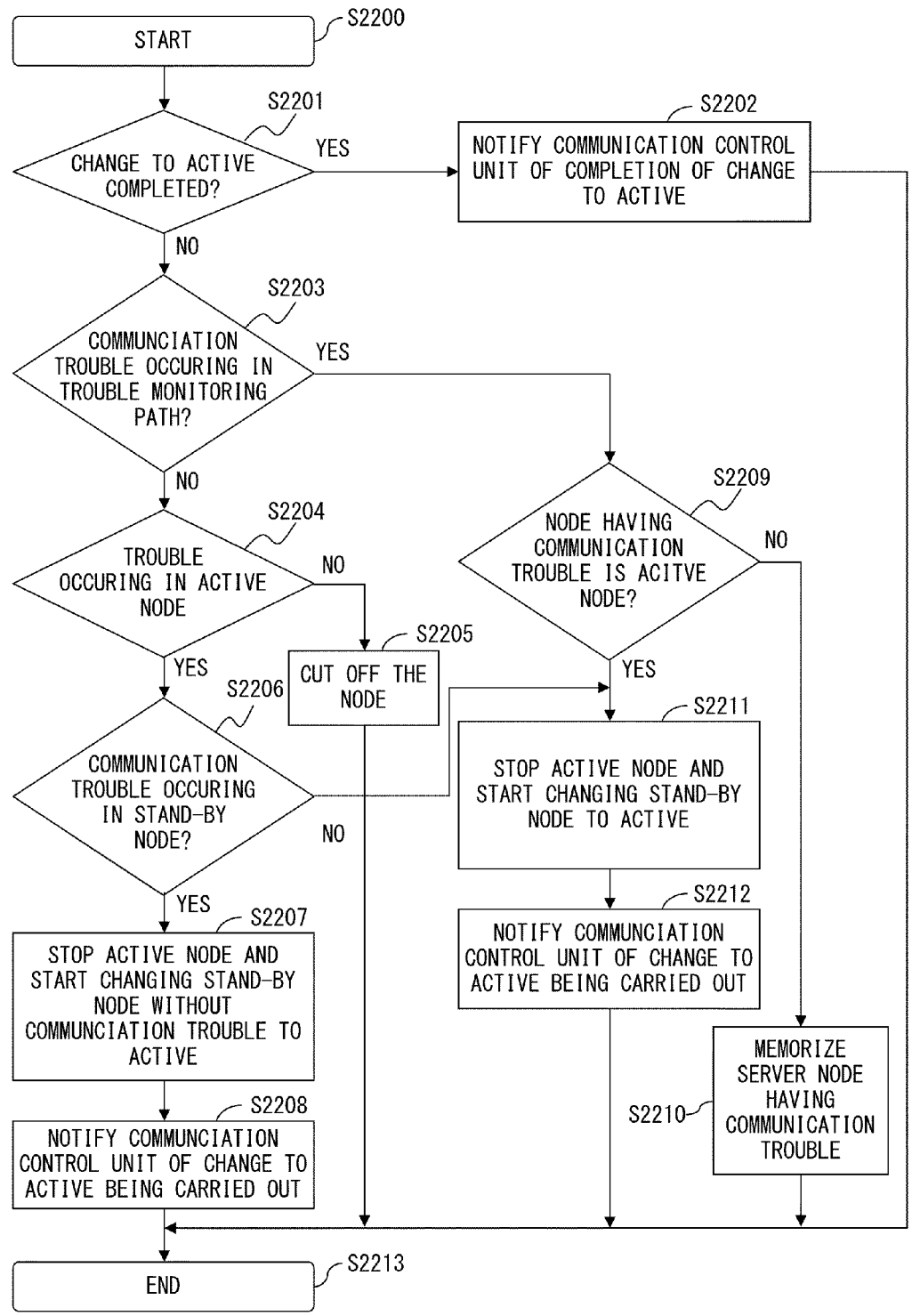
FIG. 27 is a flowchart illustrating the operation of a high reliability operation processing unit in a server node.
Figure 29:
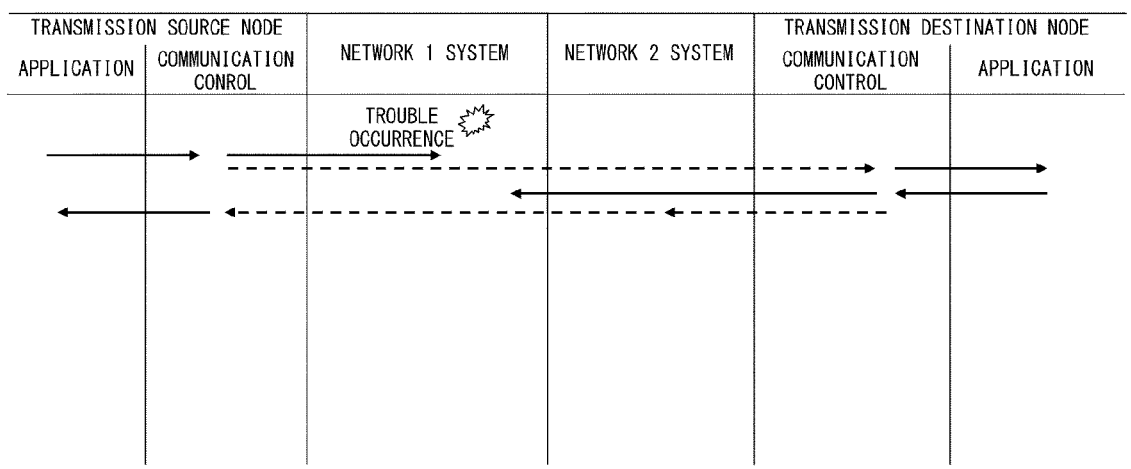
FIG. 29 is a diagram illustrating the effect of a system according to the embodiment.

FIG. 27 is a flowchart illustrating the operation of the high reliability operation processing unit 740 in the server node 120, 130 or 140 according to the embodiment.

In step S2201, the high reliability operation processing unit 740 receives an event from the server node 120, 130 or 140, and it determines whether or not the event is for the notification of the completion of the change from stand-by to active.

When the event is for the notification of the completion of the change from stand-by to active, the high reliability operation processing unit 740 moves the process forward to step S2202 (step S2201, YES).

In the step S2202, the high reliability operation processing unit 740 notifies the communication control unit 121, 131 or 141 of the server node that transmitted the event of the completion of the change from stand-by to active. At this time, the communication control unit 121, 131 or 141 that receives the notification sets the status 2 in the server control table of the server node that transmitted the event to "2" indicating the completion of the change to active.

Hereinafter, for the explanation of FIG. 27, the communication control unit 121, 131 or 141 is simply referred to as a "communication control unit".

Meanwhile, when the event is not for the notification of the completion of the change from stand-by to active, the high reliability operation processing unit 740 moves the process forward to step S2203 (step S2201, NO).

In step S2203, the high reliability operation processing unit 740 determines whether or not the event is for the notification of a communication trouble in the trouble monitoring path.

When the event is not for the notification of a communication trouble in the trouble monitoring path, the high reliability operation processing unit 740 moves the process forward to step S2204 (step S2203, YES).

In the step S2204, the high reliability operation processing unit 740 determines whether or not the event is for the notification of a trouble occurring in the active node. When the event is not for the notification of a trouble occurring in the active node, the high reliability operation processing unit 740 moves the process forward to step S2205 (step S2204, NO).

In the step S2205, the high reliability operation processing unit 740 cuts off the node that generated the event from the configuration of the system 100. For example, the node that generated the event is deleted from a configuration definition file and the like that defines the configuration of the system 100. When the cutting off of the node is completed, the high reliability operation processing unit 740 moves to step S2213 and completes the reception process of the event.

Meanwhile, when the event is for the notification of a trouble occurring in the active node in step S2204, the high reliability operation processing unit 740 moves the process forward to step S2206 (step S2204, YES).

In the step S2206, the high reliability operation processing unit 740 determines whether or not there is a server node in the stand-by status without any communication trouble. Meanwhile, when the high reliability operation processing unit 740 detects a sever node having a communication trouble, it stores the server node having the communication trouble in a predetermined storage unit (step S2210). Hereinafter, the storage information is referred to as "communication trouble node information".

When there is a server node in the stand-by status having a communication trouble, the high reliability operation processing unit 740 moves the process forward to step S2211 (step S2206 YES).

Meanwhile, in the step S2206, when a server node in the stand-by status is stored in the communication trouble node information, the high reliability operation processing unit 740 determines that the server node in the stand-by status is having a communication trouble, and moves the process forward to step S2207 (step S2206, YES).

In the step S2207, the high reliability operation processing unit 740 instructs the server node in the active status to stop operation. When the server node in the active status stops operation, the high reliability operation processing unit 740 refers to the communication trouble node information, and extracts a node in the stand-by status from the ones not stored in the communication trouble node information that has the highest predetermined priority. Then, it instructs the extracted node in the stand-by status without communication trouble to start the change to the active status.

In step S2208, the high reliability operation processing unit 740 notifies the communication control unit of the status in which the server node in the stand-by status is being changed to the active status.

At this time, if the received event is not for the notification of a communication trouble in the trouble monitoring path in step S2203, the high reliability operation processing unit 740 moves the process forward to step S2209 (step S2203, NO).

In the step S2209, the high reliability operation processing unit 740 determines whether or not the server node having the communication trouble is in the active status. When the server node having the communication trouble is not in the active status, the high reliability operation processing unit 740 moves the process forward to step S2210 (step S2209, NO).

In the step S2210, the high reliability operation processing unit 740 stores, in the communication trouble node information, the server node in which the communication trouble was detected in the step S2203.

Meanwhile, when the server node having the communication trouble is in the active status, the high reliability operation processing unit 740 moves the process forward to step S2211 (step S2209, YES).

In the step 2211, the high reliability operation processing unit 740 instructs the server node in the active status to stop operation. When the server node in the active status stops operation, the high reliability operation processing unit 740 selects a server node that has the predetermined highest priority from the server nodes in the stand-by status, and instructs the selected server node to start the change to the active status.

In step S2212, the high reliability operation processing unit 740 notifies the communication control unit of the status in which the server node in the stand-by status is being changed to the active status.

When the process in the S2205, S2208, S2210 or S2212 is completed, the high reliability operation processing unit 740 moves to step S2213 and completes the reception process of the event.

In the descriptions above, while one OS is operating in each of the client node 110, server nodes 120 and 130 in FIG. 6, the configuration is not limited to this. For example, as illustrated in FIG. 33, two or more OSs may be operating in the server nodes 120 and 130.

In the server node 120 in FIG. 33, three OSs are operating, and an application C and a communication control unit 121, an application F and a communication control unit 151, and an application G and a communication control unit 161 are respectively operating each of the OSs.

In the same manner, in the server node 130, three OSs are operating, and an application D and a communication control unit 131, an application H and a communication control unit 171, and an application I and a communication control unit 181 are respectively operating each of the OSs.

Here, the application C, F and G are supposed to provide services 1, 2 and 3, respectively, and the applications D, H and I are supposed to provide services 1, 2 and 3, respectively.

In this case, when a different port to be used by the application is assigned to each service, the client node 110 is able to perform the trouble monitoring communication for each service provided by the application.

The client control table at this time is illustrated in FIG. 34. The client control table illustrated in FIG. 34 is an example of a client control table in a case in which the recipient list is managed for each port number. The explanation of contents of the client control table is omitted here as the explanation has been made with FIG. 12.

Meanwhile, when a multicast IP address is assigned for each service, a client control table for managing the recipient list for each multicast IP address may be used.

In the system 100 according to the embodiment, two networks that are independent from each other or two or more networks that are independent from each other connects between nodes, as illustrated in FIG. 28. A communication packet is transmitted to the respective networks simultaneously.

Here, assuming the path illustrated in FIG. 28 with a solid line as network 1 system and the path illustrated with a broken line as network 2 system, since the transmission source node transmits a communication packet to both the networks simultaneously, even if a failure occurs in the network 1 system illustrated with the solid line, the communication packet reaches the transmission destination node from the transmission source node via the network 2 system illustrated with the broken line.

Meanwhile, since the transmission destination node receives the communication packet from both the network 1 system and the network 2 system, even if a failure occurs in the network 1 system, the transmission destination node can receive the communication packet from the network 2 system and can transmit a response packet in response to the communication packet.

According to the above configuration, even if a failure occurs in one of the networks, a communication packet reaches the transmission destination via the network having no failure, without changing the path in order to avoid the spot on which the failure has occurred.

As a result, even if a failure occurs in a network, the disconnection of inter-application communication due to the change of the communication path and the like can be avoided, and it becomes possible to make the duration of the disconnection of inter-application communication zero.

In the system 100 according to the embodiment, apart from the inter-application communication session, the trouble monitoring session is established between the communication control unit of the transmission source node and the communication control unit of the transmission destination node to monitor a network trouble or a trouble in the communication destination, and the transmission/reception of monitoring packets is performed at an interval shorter than the retransmission interval in the inter-application communication session.

By performing the trouble monitoring at a short interval, a network trouble or a trouble in the communication destination can be detected promptly.

Figure 30:
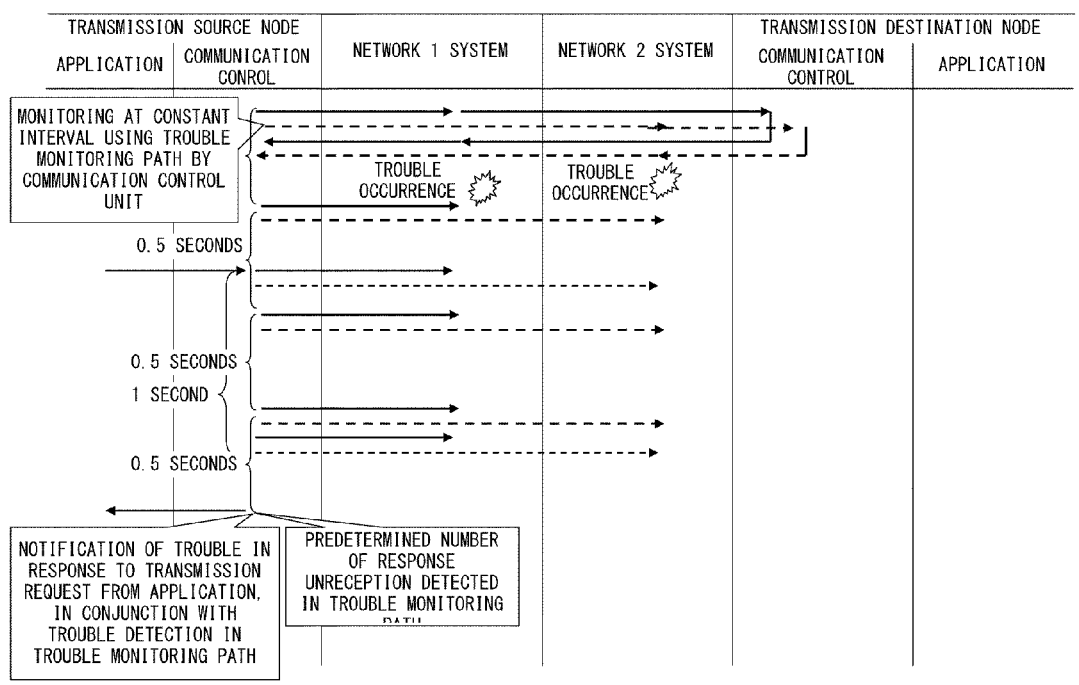
FIG. 30 is a diagram illustrating the effect of a system according to the embodiment.

For example, FIG. 30 illustrates a case in which the trouble monitoring is performed by performing the transmission/reception of a communication packet at 0.5-second intervals in the trouble monitoring session. When a failure occurs in the network 1 system and the network 2 system, the application performs the retransmission process after one second in the inter-application communication session. Meanwhile, in the trouble monitoring session, the communication control unit transmits a monitoring packet at 0.5-second intervals. Then, when the number of unreceived monitoring response packet reaches three or more, the communication control unit determines that there is a trouble in the path, and performs a notification of the trouble in the path in response to a transmission request of a communication packet from the application. As a result, the trouble is detected correctly in 1.5 seconds after the occurrence of the trouble in the network.

In addition, since the trouble monitoring is performed not by establishing a trouble monitoring session for each application but by establishing only one trouble monitoring session between the communication control units, the retransmission interval in the inter-application communication session can be set longer accordingly.

In the trouble monitoring session, while the transmission/reception of monitoring packets is performed at a short interval, since the data is very small in the minimum required size as illustrated in FIG. 11, so the network band and the CPU load in each node can be improved significantly.

Furthermore, the transmission interval in the inter-application communication session is longer, so the traffic in the entire system 100 can be reduced as a result.

Figure 31:
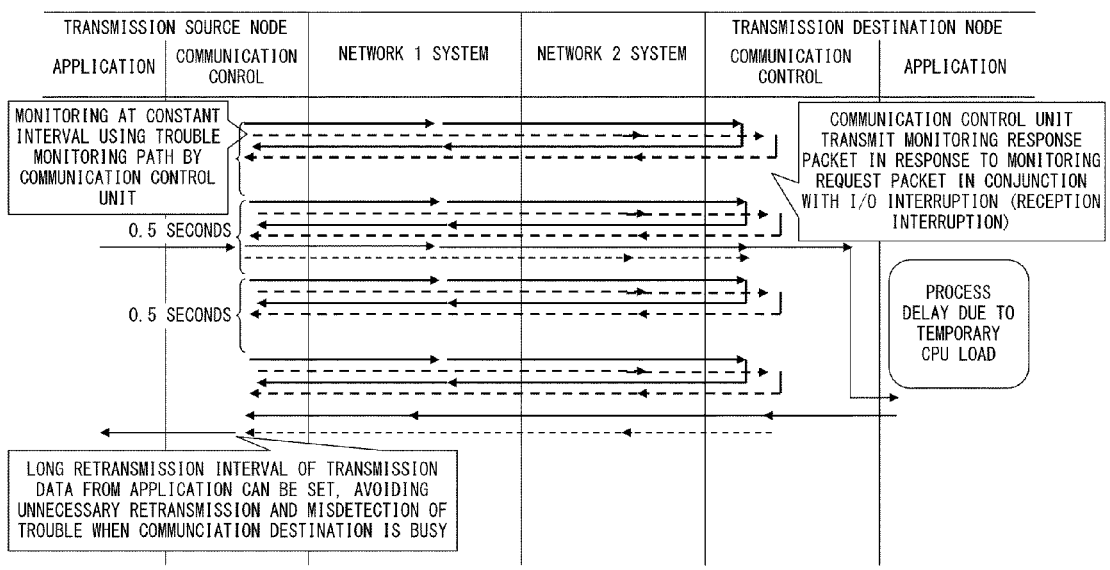
FIG. 31 is a diagram illustrating the effect of a system according to the embodiment.

The system 100 according to the embodiment performs, as illustrated in FIG. 31, the communication at constant intervals by establishing a trouble monitoring session between communication control units. Meanwhile, when the transmission destination node receives a monitoring request packet, the communication control unit operates in conjunction with I/O interruption. Then, the communication control unit performs a monitoring request packet reception process illustrated in FIG. 24 and so on, and transmits a monitoring response packet in response to the monitoring request packet.

Therefore, even if the CPU of the reception destination node is in a high load status temporarily, the response process to transmit a monitoring response packet in response to the received monitoring request packet can be carried out. Between the communication control units, the transmission/reception process of a monitoring packet can be carried out at constant intervals, so it becomes possible to set the transmission process time of a communication packet in the application in the transmission source node longer than, for example, the estimated process delay time in the transmission destination node.

As a result, a misdetection can be avoided, in which the transmission source node detects, as a trouble, the status in which the response from the application performing the inter-application communication is delayed due to the temporary high load put on the CPU in the reception destination node.

In the system 100 according to the present invention, server nodes form a clustered structure. The respective server nodes monitor the communication status of each other by means of the trouble monitoring between server nodes. Meanwhile, the client node monitors a trouble occurring in the communication paths with each server node and a trouble occurring in each server node by means of the trouble monitoring between the client node and server nodes.

When a trouble has occurred in the server node in the active status, a server node to be the target of the change to the active status is determined in accordance with information obtained as a result of the trouble monitoring between server nodes and information obtained as a result of the trouble monitoring between the client node and server nodes.

As a result, it becomes possible to determine the stand-by node in which no trouble has occurred. Accordingly, switch to the active status of an unsuitable stand-by node can be avoided.

Meanwhile, the information obtained as a result of the trouble monitoring between server nodes is, for example, the communication trouble node information explained with FIG. 27. The information obtained as a result of the trouble monitoring between the client node and server nodes is, for example, the other node status illustrated in FIG. 13.

Figure 32:
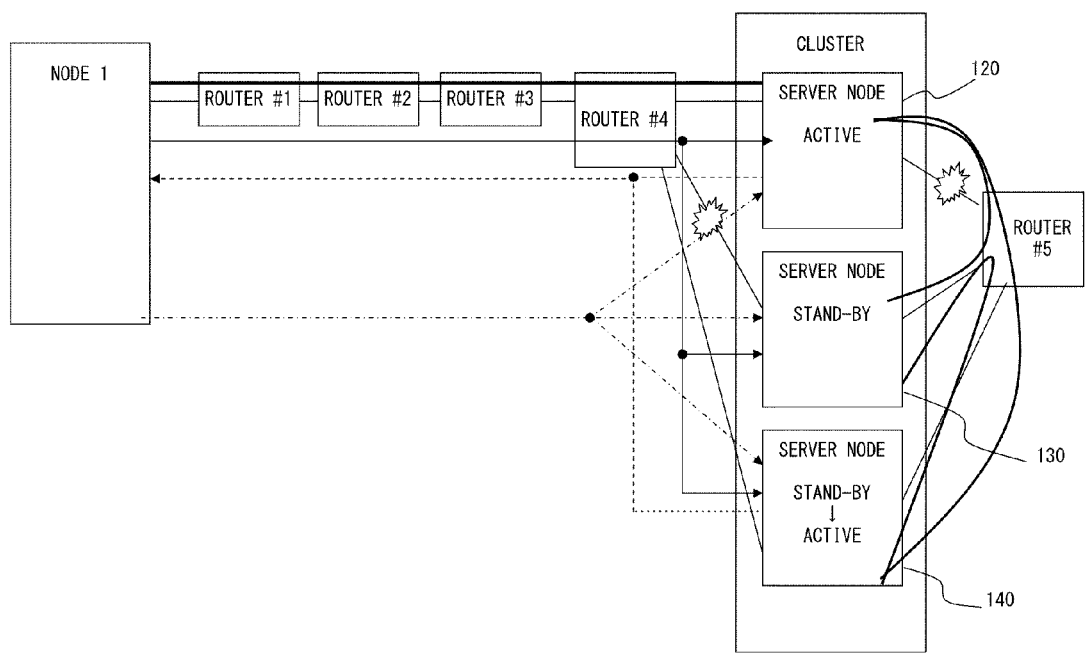
FIG. 32 is a diagram illustrating the effect of a system according to the embodiment.

For example, as illustrated in FIG. 32, if a trouble occurs in the network to the server node 130 in a router #4, the client node 110 does not receive any monitoring response packet from the server node 130 within the monitoring response request time, so it detects a trouble in the communication with the server node 130.

Then, the client node 110 stores the communication trouble in the node status illustrated in FIG. 12, and transmits the communication trouble in the node status in the monitoring packet header of the monitoring request packet, and transmits it as the notification of the occurrence of a trouble in the communication with the server node 130.

The server nodes 120 and 140 that received the monitoring request packet stores the occurrence of a trouble in the server node 130 in the other node status illustrated in FIG. 13.

In addition, when a trouble occurs in the communication with the server node 120 in the cluster illustrated in FIG. 32, for example, when the server node 140 detects a trouble in the communication with the server node 120, the server node 140 notifies the high reliability operation processing unit 740 of the detection.

The high reliability operation processing unit 740 instructs the communication control unit 141 to change the server node 140 to the active status, in accordance with the flowchart illustrated in FIG. 27 (for example, steps S2204, S2206-S2208).

In the system 100, data transfer is performed specifying a multicast IP address from the client node to the server node. Accordingly, the same data can be transmitted to all the server nodes forming the clustered structure for each network.

The communication system is applied not only to the inter-application communication session but also to the trouble monitoring session, to transmit a monitoring packet from the client node to all the server nodes forming the clustered structure constantly and to monitor the status of all the server nodes by communication control unit (the control table illustrated in FIG. 12) in the client node.

As a result, as illustrated in FIG. 32, when any monitoring response packet is not received for a predetermined time from the server node in the active status, the client node can determine correctly from which server node in the server nodes in the stand-by status in the same cluster a monitoring response packet is still received.

In addition, in the client node, by transmitting a monitoring request packet in which the node number of the server node from which a monitoring response packet is still received is set, it becomes possible for each sever node in the clustered structure to determine correctly which server node in the server nodes in the same clustered structure is still communicating with the client node normally.

Meanwhile, when changing a stand-by node to the active status, the server node that has newly been changed to the active status transmits the first monitoring response packet to be transmitted from the node while adding information indicating that the change of the active node has occurred (information of the status 2 illustrated in FIG. 11), and the client node retransmits, as the reception of the monitoring response packet with the added information as a trigger, transmission data that has been put on hold to wait for the reception of the response in the inter-application communication session. This makes it possible to minimize the disconnection time of the inter-application communication.

Thus, the system 100 makes it possible to realize inter-application communication having high reliability.

According to the embodiment, between nodes connected and made available for communication with two or more physically independent communication paths, communication is performed by transmitting the same communication packet simultaneously to all the communication paths. Therefore, even if a trouble occurs in one of the communication paths, the communication can be carried out via another communication path. Since there is no need for performing switching of communication paths and the like, it becomes possible to continue inter-application communication without disconnection.

In addition, in the trouble monitoring session, the trouble monitoring communication can be performed at a shorter interval than the interval between the retransmission processes performed in the inter-application communication session. Therefore, a sufficiently long interval between the transmission processes can be set in the inter-application.

In addition, the trouble monitoring session is established only when any trouble monitoring session for monitoring a communication trouble has not been established between a first communication control unit and a second communication control unit. In the trouble monitoring session, the trouble monitoring communication is performed using only necessary information for the trouble monitoring.

As a result, it becomes possible to improve the band of the transmission paths and the load put on the communication in each node significantly.

As described above, inter-application communication having high reliability can be provided by the program disclosed herein.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory storage medium storing a program, in inter-application communication that is communication performed between nodes connected and made available for communication with two or more communication paths independent from each other and is performed between a first application operating on a first node and a second application operating on a second node, for making the first node perform processes by transmitting a same packet simultaneously to all the communication paths, the processes comprising:
    a trouble monitoring session establishing process in which, when a request for establishment of an inter-application communication session for performing communication between the first application and the second application is received from the first application, whether or not a trouble monitoring session for monitoring a communication trouble has already been established between a first communication control unit that operates on the first node and controls at least communication of the first application and a second communication control unit that operates on the second node and controls at least communication of the second application is checked, and when the trouble monitoring session has not been established, the establishment of the inter-application communication session is held until a request for establishing the trouble monitoring session is performed to the second communication control unit and the trouble monitoring session is established;
    an inter-application communication session establishing process in which, when the trouble monitoring session has been established, a request for establishing the inter-application communication session is performed to the second application and the inter-application communication session is established; and
    a trouble monitoring communication process in which trouble monitoring communication is performed using only necessary information for trouble monitoring in the trouble monitoring session and at a shorter interval than an interval between retransmission processes in which, when a response is not received from the second application for a predetermined period of time in the inter-application communication session, a
communication packet having same contents is transmitted again to the second application.

2. The non-transitory storage medium storing the program according to claim 1, wherein
    the first communication control unit operates on an operating system on which the first application is operating, and controls communication of all applications that operate on the operating system and perform inter-application communication; and
    the second communication control unit operates on an operating system on which the second application is operating, and controls communication of all applications that operate on the operating system and perform inter-application communication.

3. The non-transitory storage medium storing the program according to claim 1, wherein
    in the trouble monitoring session, the first communication control unit transmits a communication packet to the second communication control unit specifying a multicast IP address.

4. The non-transitory storage medium storing the program according to claim 1, wherein
    in the trouble monitoring session, when a number of cases in which a response from the second communication control unit is not received for a predetermined period of time exceeds a predetermined number, it is determined that a trouble has occurred in communication with the second node.

5. The non-transitory storage medium storing the program according to claim 4, wherein
    when it is determined that a trouble has occurred in communication with the second node, the first communication control unit notifies the first application of an occurrence of a trouble in communication with the second node.

6. The non-transitory storage medium storing the program according to claim 4, wherein
    in the trouble monitoring communication process, a monitoring request packet in which information including at least presence or absence of a trouble in communication with the second node is set is transmitted simultaneously to all the communication paths.

7. A non-transitory storage medium storing a program, in inter-application communication that is communication performed between nodes connected and made available for communication with two or more communication paths independent from each other and is performed between a first application operating on a first node and a second application operating on a second node, for making the second node perform processes by transmitting a same packet simultaneously to all the communication paths, the processes comprising:
    a trouble monitoring session establishing process in which, when a request for establishing a trouble monitoring session for performing trouble monitoring communication for monitoring a communication trouble between a first communication control unit operating on the first node and controlling at least communication of the first application and a second communication control unit operating on the second node and controlling at least communication of the second application is received from the first communication control unit, the trouble monitoring session is established with the first communication control unit in conjunction with I/O interruption;
    an inter-application communication session establishing process in which, when a request for establishing an inter-application communication session for performing communication between the first application and the second application is received from the first communication control unit, the inter-application session is established with the first application, the trouble monitoring session establishing process being performed before the inter-application communication session established; and a trouble monitoring communication process in which trouble monitoring communication is performed using only necessary information for trouble monitoring in the trouble monitoring session and at a shorter interval than an interval between retransmission processes in which, when a response is not received from the second application for a predetermined period of time in the inter-application communication session, a communication packet having same contents is transmitted again from the first application to the second application.

8. The non-transitory storage medium storing the program according to claim 7, wherein
the first communication control unit operates on an operating system on which the first application is operating, and controls communication of all applications that operate on the operating system and perform inter-application communication; and
the second communication control unit operates on an operating system on which the second application is operating, and controls communication of all applications that operate on the operating system and perform inter-application communication.

9. The non-transitory storage medium storing the program according to claim 7, wherein
in the trouble monitoring session, when a number of cases in which a response from the first communication control unit is not received for a predetermined period of time exceeds a predetermined number, it is determined that a trouble has occurred in communication with the first node.

10. The non-transitory storage medium storing the program according to claim 9, wherein
when it is determined that a trouble has occurred in communication with the first node, the second communication control unit notifies the second application of an occurrence of a trouble in communication with the first node.

11. The non-transitory storage medium storing the program according to claim 9, wherein
in the trouble monitoring communication process, when a monitoring request packet in which information including at least presence or absence of a trouble in communication with the first node is set is received from the first communication control unit and a same monitoring packet as the monitoring request packet is received duplicately, the duplicately received monitoring packet is discarded.

12. The non-transitory storage medium storing the program according to claim 7, wherein
the second node is in a clustered structure of a node in an active state and one, two or more nodes in a stand-by status.

13. The non-transitory storage medium storing the program according to claim 7, wherein
the nodes in a clustered structure communicate with each other at constant intervals to monitor a communication status of each node.

14. The non-transitory storage medium storing the program according to claim 12, wherein from a monitoring request packet that is a communication packet transmitted from the first communication control unit and has information including presence or absence of a communication trouble with each node included in the second node forming a clustered structure, information related to a communication trouble of each node included in the second node is obtained; and a node to be changed to an active status is determined from the obtained information related to a communication trouble of each node included in the second node and information related to a communication trouble of each node included in the second node obtained as a result of monitoring of a communication status of each node by means of mutual communication performed at constant intervals by each node included in the second node forming a clustered structure.

15. A communication apparatus having a non-transitory storage medium for inter-application communication performed between a first application operating on a first node and a second application operating on a second node connected and made available for communication with two or more communication paths that are independent from each other, in which units perform communication with transmission of a same packet simultaneously to all the communication paths, the units comprising:

a trouble monitoring session establishing unit that checks, when a request for establishment of an inter-application communication session for performing communication between the first application and the second application is received from the first application, whether or not a trouble monitoring session for monitoring a communication trouble has already been established between a first communication control unit that operates on the first node and controls at least communication of the first application and a second communication control unit that operates on the second node and controls at least communication of the second application, and when the trouble monitoring session has not been established, the establishment of the inter-application communication session is held until performs a request for establishing the trouble monitoring session to the second communication control unit and establishes the trouble monitoring session;

an inter-application communication session establishing unit that performs, when the trouble monitoring session has been established, a request for establishing the inter-application communication session to the second application and establishes inter-application communication session; and a trouble monitoring communication unit that performs trouble monitoring communication using only necessary information for trouble monitoring in the trouble monitoring session and at a shorter interval than an interval between retransmission processes in which, when a response is not received from the second application for a predetermined period of time in the inter-application communication session, a communication packet having same contents is transmitted again to the second application.

* * * * *